(12) United States Patent
Chuiko et al.

(10) Patent No.: US 11,644,128 B2
(45) Date of Patent: May 9, 2023

(54) DEVICE FOR THE INTERNAL MONOLITHIC INSULATION OF A WELDED PIPELINE JOINT

(71) Applicant: Aleksandr Georgievich Chuiko, Moscow (RU)

(72) Inventors: Aleksandr Georgievich Chuiko, Moscow (RU); Anastasia Aleksandrovna Chuyko, Moscow (RU)

(73) Assignee: Aleksandr Georgievich Chuiko, Moscow (RU)

( * ) Notice: Subject to any disclaimer, the term of this patent is extended or adjusted under 35 U.S.C. 154(b) by 534 days.

(21) Appl. No.: 16/649,435

(22) PCT Filed: Jun. 5, 2018

(86) PCT No.: PCT/RU2018/000366
§ 371 (c)(1),
(2) Date: Mar. 20, 2020

(87) PCT Pub. No.: WO2019/070153
PCT Pub. Date: Apr. 11, 2019

(65) Prior Publication Data
US 2020/0240555 A1    Jul. 30, 2020

(30) Foreign Application Priority Data
Oct. 2, 2017  (RU) .......................... RU2017134087

(51) Int. Cl.
*F16L 55/12*      (2006.01)
*F16L 13/02*      (2006.01)
(Continued)

(52) U.S. Cl.
CPC ......... *F16L 13/0263* (2013.01); *F16L 55/134* (2013.01); *F16L 58/1009* (2013.01);
(Continued)

(58) Field of Classification Search
CPC . F16L 13/0263; F16L 55/134; F16L 58/1009; F16L 58/181
(Continued)

(56) References Cited

U.S. PATENT DOCUMENTS 385,600  A  *  7/1888  Durbrow ............. E21B 33/1277
                                                 175/323
2,610,651 A  *  9/1952  Hahn .................... G01M 3/022
                                                 138/90
(Continued)

FOREIGN PATENT DOCUMENTS

DE         4336435 A1    4/1995
EP      0 748 977 A2    12/1996
(Continued)

OTHER PUBLICATIONS

International Search Report of PCT/RU2018/000366, dated Nov. 15, 2018.

*Primary Examiner* — James F Hook
(74) *Attorney, Agent, or Firm* — Collard & Roe, P.C.

(57) ABSTRACT

A device internally insulating a welded pipeline joint between pipes having an internal protective coating, in a first variant, includes a power actuator having a cylindrical elastic working member for radial expansion when excess pressure occurs inside its cavity. A cylindrical casing of elastic anti-adhesive material arranged coaxially on the member exterior can have channels for exhausting air and supplying a compound. In a second variant, the device sleevelessly insulates an annular space. A casing made of an anti-adhesive material is centrally reinforced by an elastic cord. Using a cylindrical elastic anti-adhesive casing coaxially arranged on the exterior of a power actuator elastic working member forms an annular space in the weld zone either using a protective sleeve, or by a reinforced casing portion. A vacuum in the space is filled by a compound. The (Continued)

elastic anti-adhesive material allows easy removal of the casing from the hardened compound surface.

22 Claims, 34 Drawing Sheets

(51) Int. Cl.
    *F16L 58/10*     (2006.01)
    *F16L 55/134*     (2006.01)
    *B23K 101/10*     (2006.01)
    *B23K 9/028*     (2006.01)
    *B29C 65/00*     (2006.01)
    *F16L 58/18*     (2006.01)

(52) U.S. Cl.
    CPC ........ *B23K 9/0282* (2013.01); *B23K 2101/10* (2018.08); *B29C 66/72321* (2013.01); *F16L 58/181* (2013.01)

(58) Field of Classification Search
    USPC ....................................... 138/93, 149, 97, 98
    See application file for complete search history.

(56) References Cited

U.S. PATENT DOCUMENTS

| | | | |
|---|---|---|---|
| 3,103,235 A * | 9/1963 | Stringham, III | F16L 55/16455 138/93 |
| 3,111,431 A * | 11/1963 | Weaver | F16L 58/02 118/DIG. 10 |
| 3,762,446 A | 10/1973 | Tungseth et al. | |
| 3,834,421 A * | 9/1974 | Daley | F16L 55/16455 138/93 |
| 3,834,422 A * | 9/1974 | Larson | F16L 55/16455 138/93 |
| 4,067,349 A * | 1/1978 | Austin | G01M 3/2853 73/40.5 R |
| 4,349,204 A * | 9/1982 | Malone | E21B 33/1277 166/120 |
| 4,413,653 A | 11/1983 | Carter, Jr. | |
| 4,423,754 A * | 1/1984 | Carter, Jr. | F16L 55/132 138/93 |
| 4,467,835 A | 8/1984 | Champleboux | |
| 4,582,551 A | 4/1986 | Parkes et al. | |
| 4,861,248 A | 8/1989 | Ben | |
| 5,066,208 A * | 11/1991 | Warmerdam | G01M 3/2853 264/269 |
| 5,351,720 A | 10/1994 | Maimets | |
| 5,901,752 A | 5/1999 | Lundman | |
| 5,924,743 A | 7/1999 | Bonmartin et al. | |
| 7,661,443 B1 | 2/2010 | Miksis | |
| 2002/0083988 A1 | 7/2002 | Lundman | |
| 2005/0279417 A1* | 12/2005 | Bednarzik | F16L 55/179 138/93 |
| 2006/0130923 A1* | 6/2006 | Lepola | F16L 55/44 138/93 |
| 2013/0284297 A1 | 10/2013 | Hacikyan | |
| 2016/0168719 A1 | 6/2016 | Chuyko et al. | |

FOREIGN PATENT DOCUMENTS

| | | |
|---|---|---|
| FR | 2736989 A1 | 1/1997 |
| RU | 2079033 C1 | 5/1997 |
| RU | 2 133 908 C1 | 7/1999 |
| RU | 2 328 651 C1 | 7/2008 |
| RU | 2 552 627 C2 | 6/2015 |
| WO | 01/16518 A1 | 3/2001 |

* cited by examiner

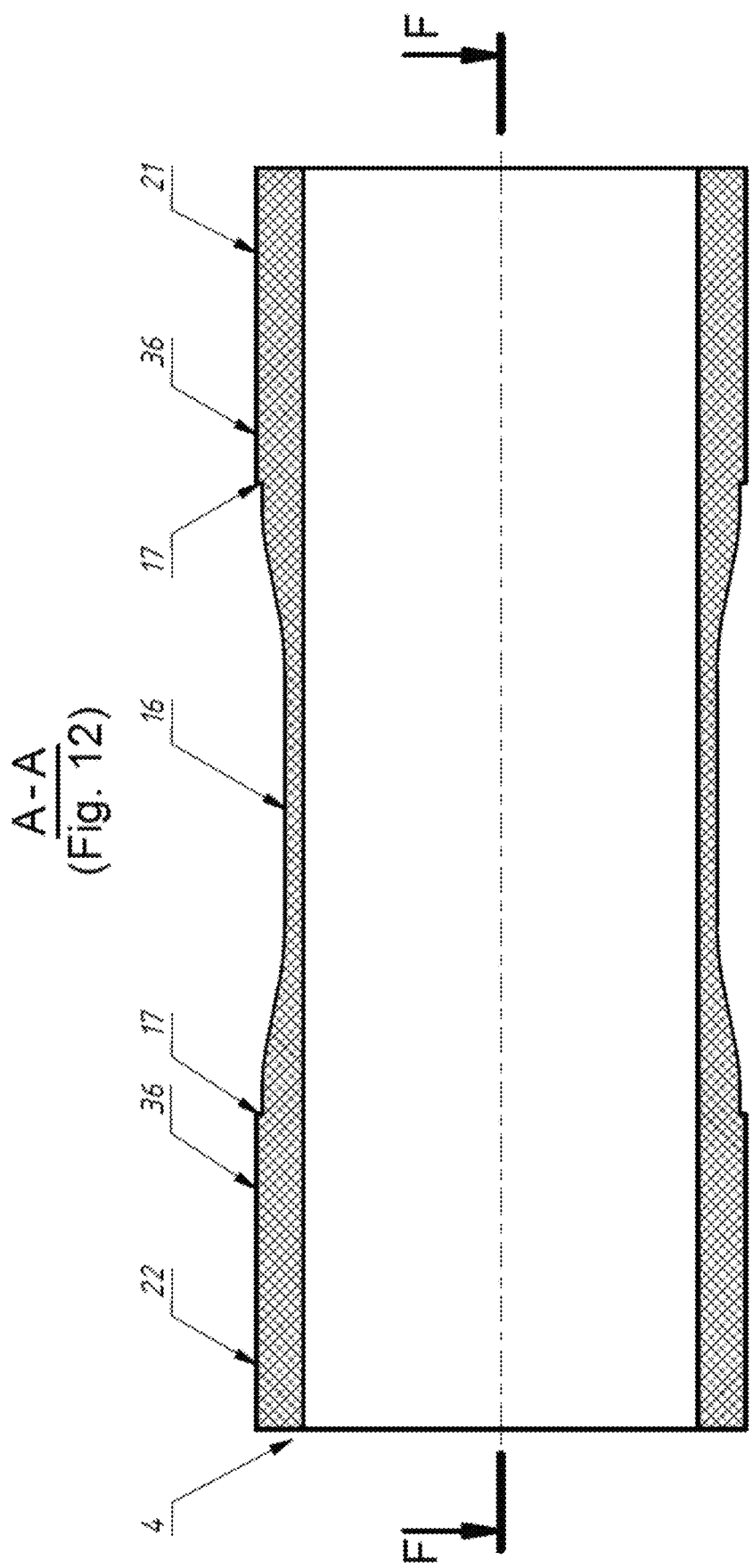

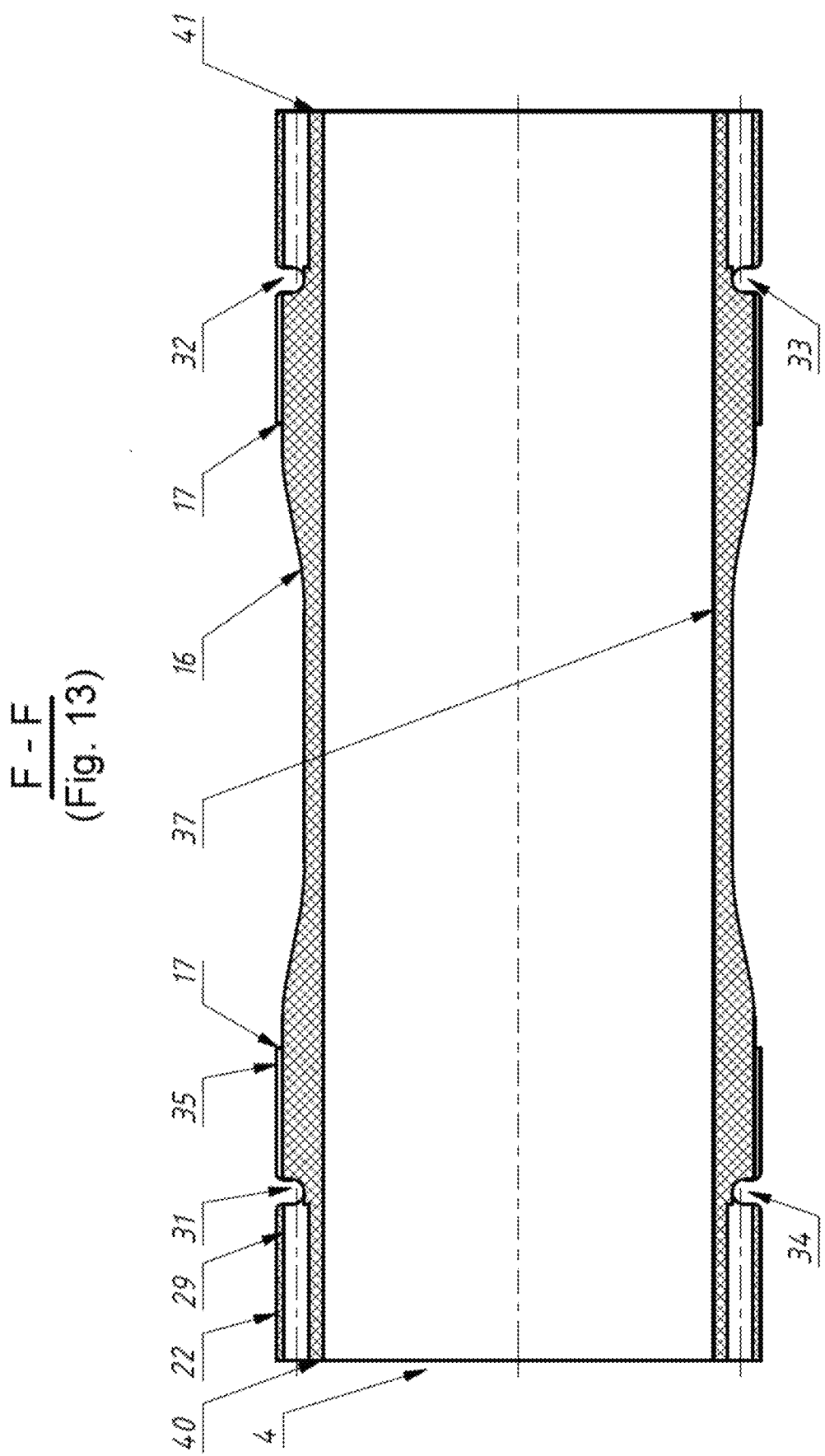

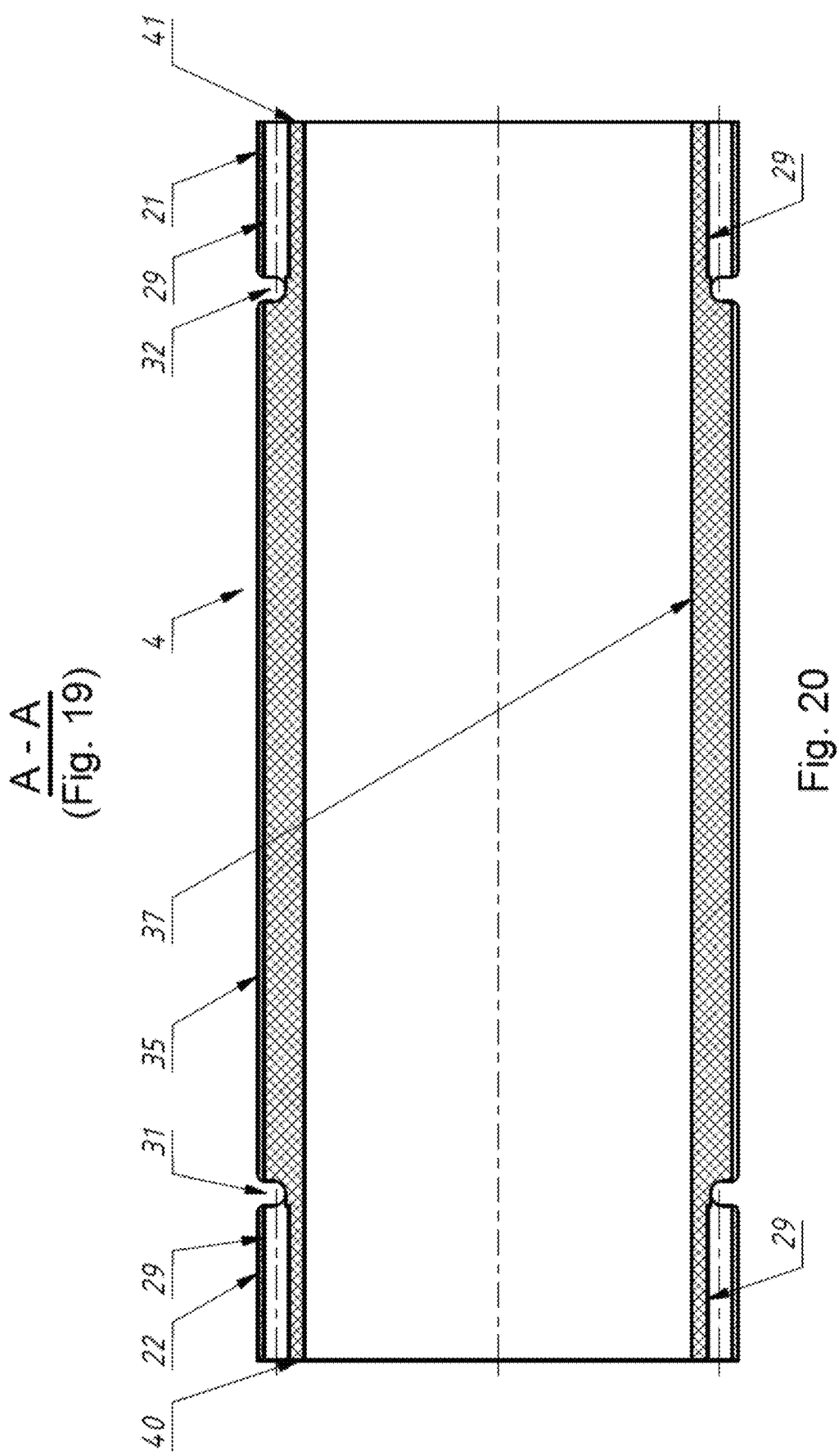

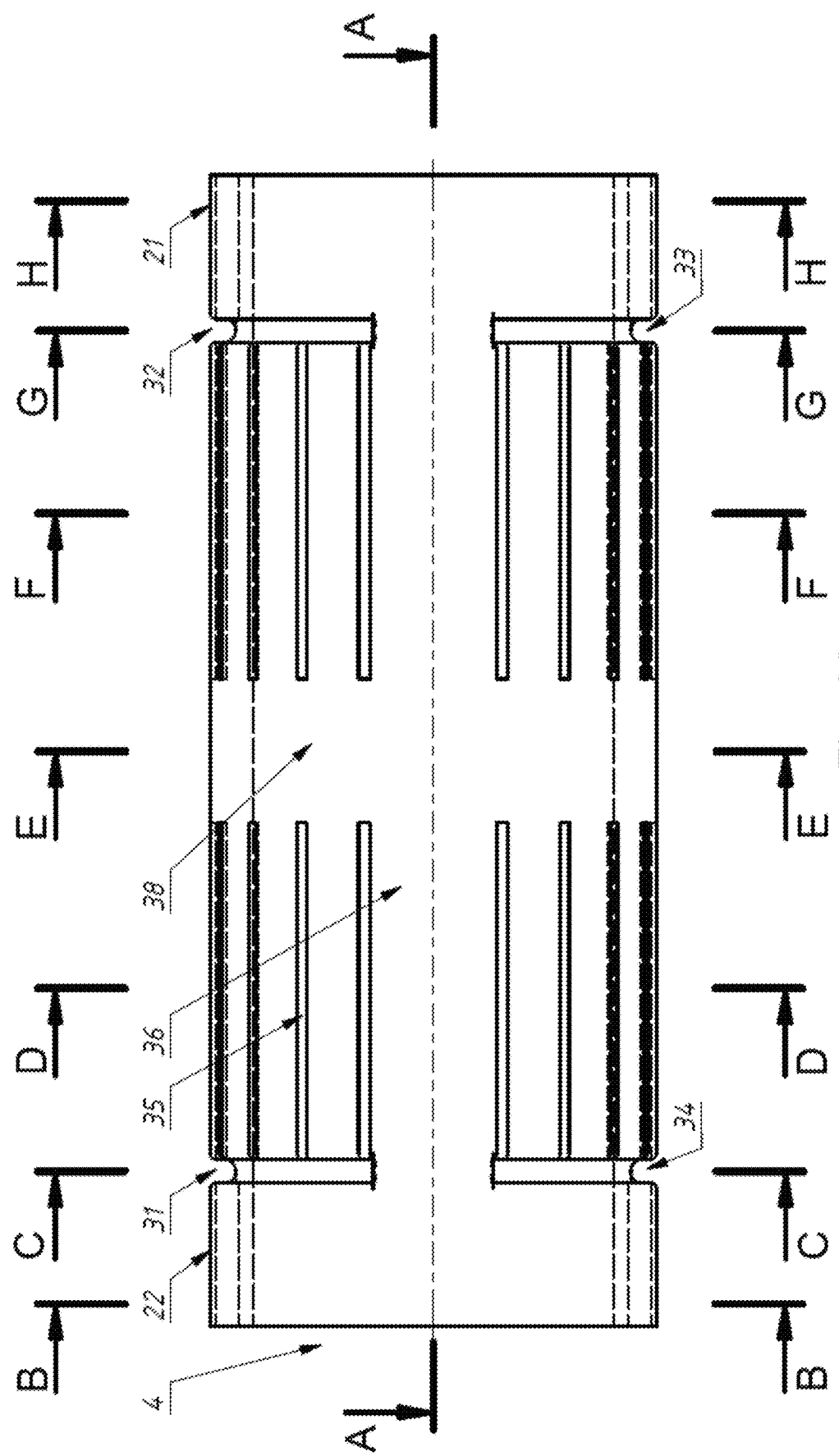

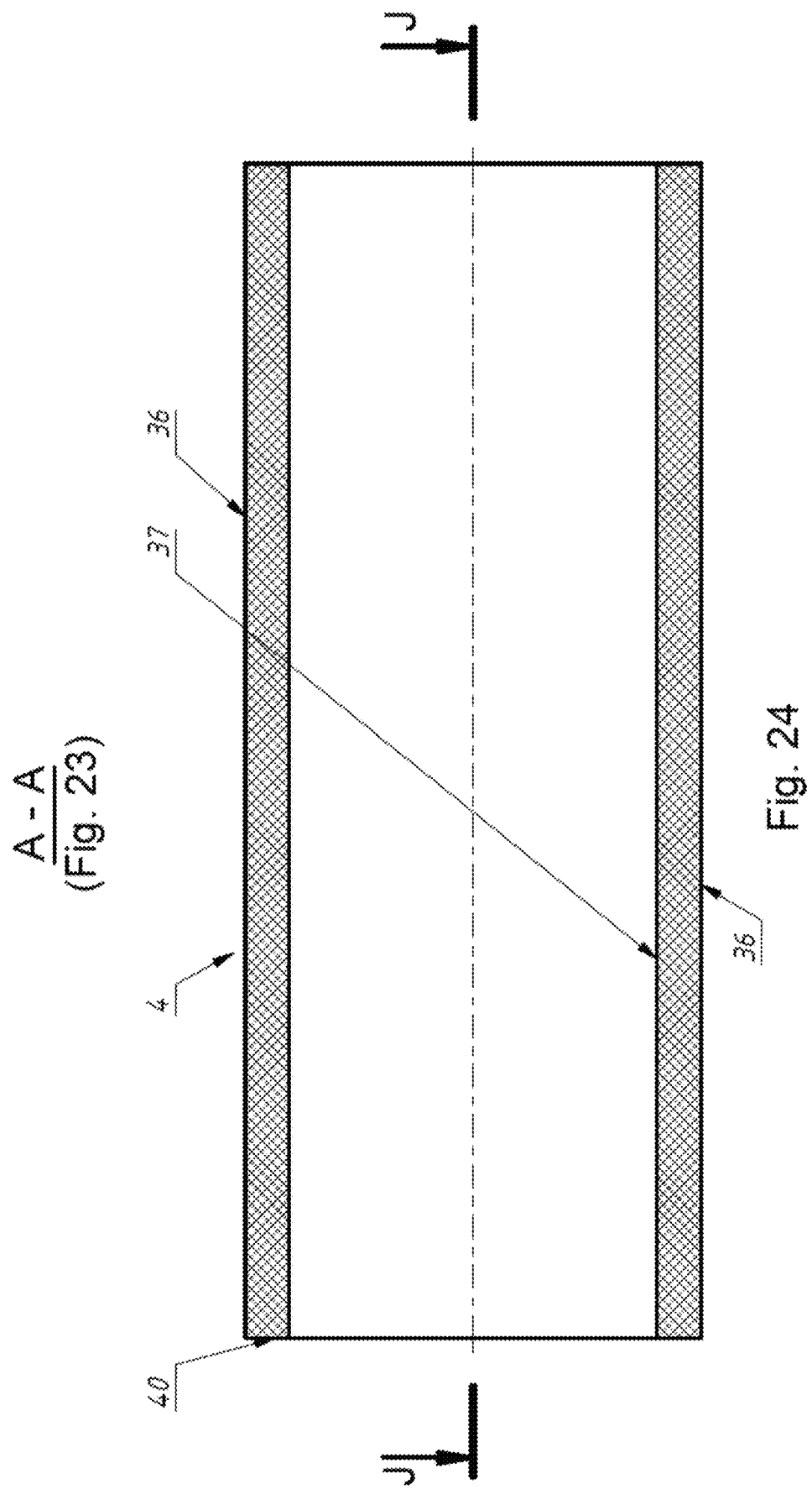

DEVICE FOR THE INTERNAL MONOLITHIC INSULATION OF A WELDED PIPELINE JOINT

CROSS REFERENCE TO RELATED APPLICATIONS

This application is the National Stage of PCT/RU2018/000366 filed on Jun. 5, 2018, which claims priority under 35 U.S.C. § 119 of Russian Application No. 2017134087 filed on Oct. 2, 2017, the disclosure of which is incorporated by reference. The international application under PCT article 21(2) was not published in English.

FIELD OF THE INVENTION

The present invention relates to pipeline building and can be used for the internal insulation of a welded pipe joint having an internal protective coating.

BACKGROUND OF THE INVENTION

The Chuiko process of anticorrosive protection for a welded pipe joint having an internal protective coating is known (RU patent 2552627 C2, published on 10.06.15), that comprises the coaxial insertion of a protective steel bushing inside the pipes to be joined with the formation of an annular cavity (a space) between the external surface of the bushing and the internal insulated surface of the welded pipe joint together with the adjoining portions having a protective coating, the sealing of the annular cavity on the ends of the bushing which is followed by the annular cavity filling with a liquid sealing material. The annular cavity sealing on the bushing ends is carried out by pushing-in the bushing ends into the sealing compound deposited onto the pipe surface. The process does not provide for the use of a particular device for sealing the annular cavity.

A releasing device having an elastic element made of a heat-resistant anti-adhesive material and a pneumatic hydraulic drive for expanding the same is known (RU 2328651 C1, published on Jul. 10, 2008). A film fibrous bandage impregnated on both sides with a liquid binding compound is wrapped in a spiral onto the elastic element of the releasing device. The device is inserted into the internal cavity of the pipe and is placed in the area of the welded joint to be insulated. The releasing device is actuated by a pneumatic hydraulic drive. The elastic element applies the bandage to the internal surface of the pipeline welded joint. The polymer binder is heated by an inductor to provide polymerization. The polymerization completed, the elastic element of the releasing device is detached from the bandage. The device is removed from the pipeline cavity. The device described has the following disadvantages:

1. When applying the bandage onto the internal surface of the welded pipeline joint, the elastic casing of the releasing device exerts a substantially high and uniform pressure onto the film fibrous bandage along the full length of the surface of the same. At the places of defects (flashes, burrs, metal icicles, etc.) formed when welding, the bandage can be forced through which breaks the tightness of the insulating layer that often cannot be visually detected.

2. The device does not enable complete elimination of air from under the bandage which inevitably results in the formation of bubbles and air spaces in the area of the insulated surface of the pipeline joint, the weld root and the weld seam area of the same being the most vulnerable place where flashes, burrs and other welding defects appear when welding. This fact considerably reduces the insulation adhesion in general while the bandage can be exfoliated from the internal surface of the pipeline at the most dangerous area of the welded seam. During the pipeline service, under the effect of the pumped medium, the defects described result in a progressive penetration of an aggressive medium into the voids formed and in a subsequent bandage exfoliation. For this reason, this process is not applied in practice when building new pipelines.

3. While increasing the elimination degree of air spaces between the bandage and the insulated surface of the welded joint of the pipeline by the pressure increase inside the releasing device, the polymer binder is eliminated from the bandage and the adhesion of the same becomes impossible which reduces to zero the whole process of insulation.

4. The considered releasing device is designed to apply the bandage to the internal surface of the pipeline and cannot be used to provide internal insulation of the welded joint with the use of vacuum that is the only highly efficient way to prevent formation of air bubbles or interlayers in the insulated area of the welded joint and, respectively, to drastically improve the insulation quality of the pipeline welded joint. This is due to the fact that the elastic casing of the releasing device does not demonstrate the needed combination of properties. On the one hand, to provide a reliable tightness that enables one to get vacuum tightness of the annular space in the welded seam, an increased pressure should be built in the elastic casing of the releasing device (usually, it should be not lower than 2.0-2.5 bars or higher). Consequently, the elastic casing of the releasing device should be made of a relatively rigid material able to withstand an increased internal pressure and to expand radially while the length of the device remains stable. On the other hand, to provide a guaranteed vacuum-tight contact between the elastic casing of the releasing device and the internal surface of the pipeline at the area of insulating the welded joint, this casing should be smooth and compliant in order to provide a maximally full contact of the connected surfaces and to provide the needed compression degree of the tightening casing. The above given requirements contradict each other and for this reason cannot be provided by the considered device.

5. The use of a polymer bandage twisted in spiral neither can provide for a vacuum-tight contact in the insulated area since it is not hermetically sealed and has the shape of a spiral at the ends of which longitudinal slits (steps) are formed on the whole width of the bandage. Besides, the elastic casing should provide anti-adhesive properties.

6. The considered releasing device does not enable one to supply a sealing compound into the area of the welded joint insulation inside the internal cavity of the pipeline.

7. This releasing device does not enable one to provide heating of the polymer binder through the internal cavity of the pipeline during the polymerization process.

8. Visual control of the insulation tightness of the pipeline welded joint with the help of a video head does not provide for complete or reliable information about the insulation quality.

The closest releasing device to the described above is that providing anti-corrosive protection for welded joints of pipelines (RU 2133908 C1, published on Jul. 27, 1999). This releasing device represents an elastic casing on which a spirally rolled metal tape and a spirally rolled bandage impregnated with a polymer binder are arranged in series. The releasing device is inserted into the pipeline in the area of the welded joint of pipes. A working fluid such as compressed air is supplied under a calculated pressure into the elastic casing, the elastic casing expands and presses the bandage and the metal band rolled up in a spiral against the internal surface of the pipeline with a calculated effort. When the bandage is squeezed, some amount of polymer binder is forced out from under the bandage at the ends of the expanding metal bushing and in the area of the lock joint along the whole length of the bushing. The polymer binding compound is polymerized which results in the sticking of the bandage to the internal surface of the pipeline on one side and to the metal band with the lock joint on the other side. The releasing device with the elastic casing is extracted from the pipeline. The present device has the disadvantages as follows:

1. The elastic casing of the releasing device does not demonstrate anti-adhesive properties. The polymer binding compound forced out when squeezing the bandage gets into contact with the elastic casing of the releasing device which inevitable results in sticking of the same to the metal band/bandage. At the final stage, this fact considerably hampers the process of hermetic sealing of the welded joint: firstly, it strongly complicates the extracting process of the releasing device from the pipeline cavity, and secondly, it causes a downswing of the life cycle of the releasing device itself, in particular of the elastic casing of the same due to a quick wear of the last.

2. The device does not enable one to provide for a complete air elimination from under the bandage and the metal band which inevitably results in the formation of bubbles and air spaces at the area of the insulated surface of the pipeline joint, the weld root and the weld seam area of the same being the most vulnerable place where flashes, burrs and other welding defects appear when welding. This fact considerably reduces the insulation adhesion in general while the bandage can be exfoliated from the internal surface of the pipeline at the most dangerous area of the welded seam. During the pipeline service, under the effect of the pumped medium, the defects described result in a progressive penetration of an aggressive medium into the voids formed and in a subsequent bandage exfoliation. Taking this fact into consideration, the considered device is to be most preferably used when urgently debugging leaks of operating pipelines with a subsequent reiterated repair by more advanced procedures. For this reason, this process is not practically applied when building new pipelines.

3. While increasing the elimination degree of air spaces between the bandage and the insulated surface of the welded joint of the pipeline by the pressure increase inside the releasing device, the polymer binder is eliminated from the bandage and the adhesion of the same becomes impossible which reduces to zero the whole process of insulation.

4. The considered releasing device is designed to apply the bandage to the internal surface of the pipeline and cannot be used to provide internal insulation of the welded joint with the use of vacuum that is the only highly efficient way to prevent formation of air bubbles or spaces in the insulated area of the welded joint and, respectively, to drastically improve the insulation quality of the pipeline welded joint. This is due to the fact that the elastic casing of the releasing device does not demonstrate the needed combination of properties. On the one hand, to provide a reliable tightness that enables one to get vacuum tightness of the annular space in the welded seam, an increased pressure should be built in the elastic casing of the releasing device (usually, it should be not lower than 2.0-2.5 bars or higher). Consequently, the elastic casing of the releasing device should be made of a relatively rigid material able to withstand an increased internal pressure and to expand radially when the length of the device remains stable. On the other hand, to provide a guaranteed vacuum-tight contact between the elastic casing of the releasing device and the internal surface of the pipeline at the area of insulating the welded joint, this casing should be smooth and compliant in order to provide a maximally full contact of the connected surfaces and to provide the needed compression degree of the hermetically sealing casing. The above given requirements contradict each other, and for this reason they cannot be provided by the considered device. In addition, the exceptional requirement is that the casing providing the tightness of the insulated surface of the welded joint should be of a cylindrical shape without defects on its external surface that contacts the internal surface of the pipeline welded joint.

5. The use of a metal expanding bushing made as a corrosion-resisting band rolled in a spiral with lock joints results in the formation of two stages with the height equal to the thickness of the metal band (1-2 mm), which forms two additional spaces along the whole length of the bushing. This fact is the base of an additional difficulty when providing the tightness of the welded joint with the application of vacuum.

6. The use of a polymer bandage twisted in spiral neither can provide for a vacuum-tight contact in the insulated area since it is not hermetically sealing and has the shape of a spiral at the ends of which longitudinal slits (steps) are formed on the whole length of the bandage. Besides, the elastic casing should provide anti-adhesive properties.

7. The considered releasing device does not enable one to supply a sealing compound into the area of the welded joint insulation by the internal cavity of the pipeline.

8. This releasing device does not enable one to provide heating of the polymer binder by the internal cavity of the pipeline during the polymerization process.

9. The device does not enable one to provide control of the insulation tightness of the pipeline welded joint or of the insulation of the same.

SUMMARY OF THE INVENTION

The technical problem to be solved by the present invention is to build a device providing for the internal insulation of a welded joint by forming an annular cavity at the area of the welded joint, by creating vacuum in the last and filling the same with a compound.

This technical problem is solved by a device for the internal insulation of a welded pipeline joint according to a first embodiment, the device comprising a power actuator having a cylindrical elastic working member adapted for radial expansion when an excess pressure is created inside the cavity thereof, a cylindrical casing made of elastic anti-adhesive material being arranged coaxially on the external surface of the working member.

What is more, the power actuator can comprise a case having the shape of a hollow cylinder closed at its ends, having a nipple at one end and holes in the cylindrical wall, the elastic working member being coaxially secured on the external surface of the case.

The power actuator can be made without a case as well, the working member being made closed and having a nipple.

Furthermore, the casing can be made with a bed to support a protective bushing, made as an annular recess with side annular stops made as steps on the external surface of the casing.

Besides, the casing can be made with a bed to support a protective bushing, made as an annular recess open at one side and having a side annular stop made as a step on the external surface of the casing.

Besides, the casing can be made of two parts the axial distance between which is less than the length of the protective bushing.

Furthermore, the casing can be made with at least one channel for air pumping out and with at least one channel for supplying a compound, the entry of each channel being situated near a casing end and the outlet thereof being located on the external surface thereof at an area situated on the end of the portion foreseen to be attached to the protective bushing.

In this case, at least one channel for air pumping out and at least one channel for supplying a compound are located near one end of the casing and are provided with hermetically sealed inlets.

According to another embodiment, at least one channel for air pumping out and at least one channel for supplying a compound are located near different ends of the casing and are provided with hermetically sealed inlets, the hermetically sealed inlets of the channels situated near one end of the casing passing inside the case providing that the inlets of all the hermetically sealed entries are located near one end of the casing.

In this case, the casing can have an annular distribution groove at some distance from each end, one of the annular grooves communicating with at least one channel for air pumping out, and the other with at least one channel for supplying a compound.

An embodiment is possible when the casing has two arched grooves at some distance from each end, one of which communicates with at least one channel for air pumping out and the other, with at least one channel for supplying a compound.

In both last cases, the casing can have longitudinal grooves at a portion of the external surface between the distribution grooves, that communicate with the last.

In this case, the longitudinal grooves either pass along the whole length of the portion between the distribution grooves or an annular recess with inclined edges is made at the middle part of the portion of the casing external surface between the distribution grooves, the longitudinal grooves being located at the end parts of the portion of the casing external surface, that adjoin the distribution grooves.

In the last case, annular stops made as steps are arranged on the borders of the annular recess.

An embodiment is possible when each one of the longitudinal grooves has a length that is less than the half of the portion of the casing external surface between the distribution grooves thus forming a smooth portion of the external surface in the middle part of the casing.

Besides, a heating element can be incorporated into the casing, made as a flexible cable with longitudinal coils, some portions of which being located inside the casing along the axis of the same while the portions that connect the same are located outside the casing ends.

The technical problem is solved as well by a device for the internal insulation of a welded pipeline joint according to the second embodiment, comprising a power actuator having a cylindrical elastic working member made with a possibility of radial expansion when an excessive pressure is created in the cavity thereof, a cylindrical casing made of an elastic anti-adhesive material the middle part of which is reinforced by an elastic cord being coaxially arranged on the external surface of the working member.

Furthermore, the power actuator preferably comprises a case with the shape of a hollow cylinder closed at the ends thereof having a nipple at an end and holes in the cylinder wall, the elastic working member being coaxially attached outside the case.

Besides, the casing can be made with at least one channel for air pumping out and at least one channel for supplying a compound, the inlet of each channel being arranged near the end side of the casing while the outlet is arranged at the external surface thereof at the area of the border of the reinforced portion.

In this case, at least one channel for air pumping out and at least one channel for supplying a compound can be arranged near one casing end and can be provided with hermetically sealed inlets.

In accordance with the other embodiment, at least one channel for air pumping out and at least one channel for supplying a compound can be arranged near different casing ends and can be provided with hermetically sealed inlets, the hermetically sealed inlets for the channels located at one casing end passing inside the case providing that the inlets of all the hermetically sealed inlets are located near the same end of the casing.

The technical result achieved by the proposed embodiments of the device lies in the fact that the use, in the structure of the device, of a cylindrical elastic anti-adhesive casing coaxially arranged on the external surface of the elastic working member of the power actuator provides for the formation of an annular cavity in the area of the welded joint either with the help of a protective bushing or by the formation of a reinforced casing portion with the subsequent creation of vacuum in the same and filling thereof with a compound, as well as the easy separation of the anti-adhesive casing from the surface of the hardened compound.

DESCRIPTION OF THE DRAWINGS

The present invention is illustrated by the following drawings.

FIG. 13 shows an A-A section of FIG. 12.

FIG. 18 shows a F-F section of FIG. 13.

FIG. 20 shows an A-A section of FIG. 19.

FIG. 23 shows the casing of the device in accordance with the first embodiment for a previously mounted protective bushing with arched distribution grooves.

FIG. 24 shows a A-A section of FIG. 23.

PREFERRED EMBODIMENTS OF THE INVENTION

Figure 1:
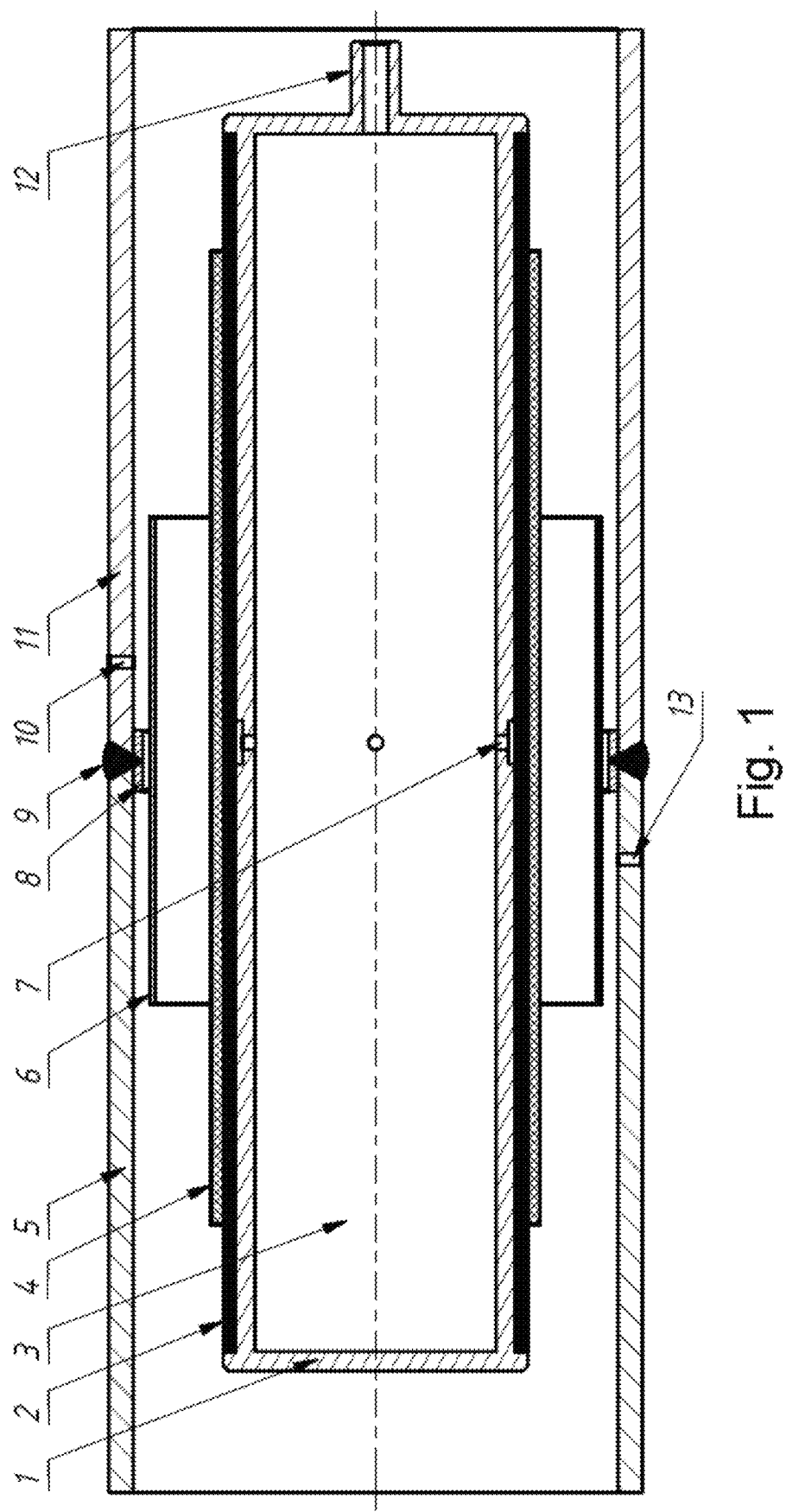
FIG. 1 is a device of the present invention in accordance with the first embodiment of the invention in its axial section.

FIG. 1 shows a diagram of the easiest execution of the device in accordance with the first embodiment of the present invention for the internal monolithic insulation of a welded pipeline joint. The device comprises a power actuator having a cylindrical case 1, a cylindrical elastic working member 2 coaxially mounted on the same, the case 1 having an internal cavity 3, gas distribution holes 7 in the cylindrical wall and a nipple 12 in the end wall. On the external surface of the working member 2, a cylindrical casing 4 is arranged, made of an elastic, vacuum-tight, anti-adhesive material, such as silicone. In the easiest execution, the casing 4 represents an elastic vacuum-tight sleeve. In the initial position, the device is located inside the pipes 5 and 11, at the area of their welded joint 9. A protective steel bushing 6 is located between the device and the pipes 5, 11. An annular cushion 8 is arranged on the internal surface of a welded joint 9.

Figure 2:
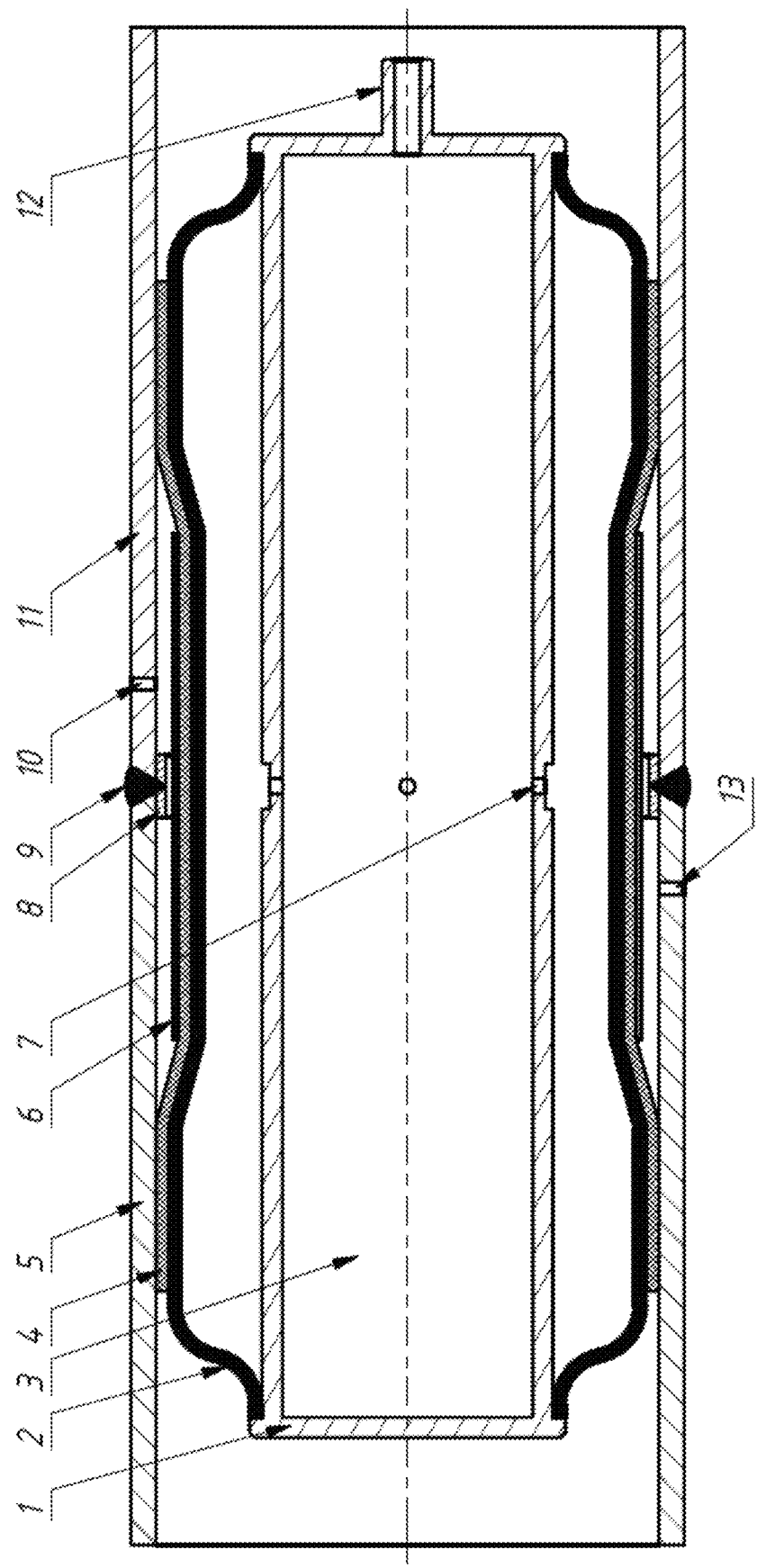
FIG. 2 is a device in accordance with the first embodiment in operating condition inside the pipeline.
Figure 3:
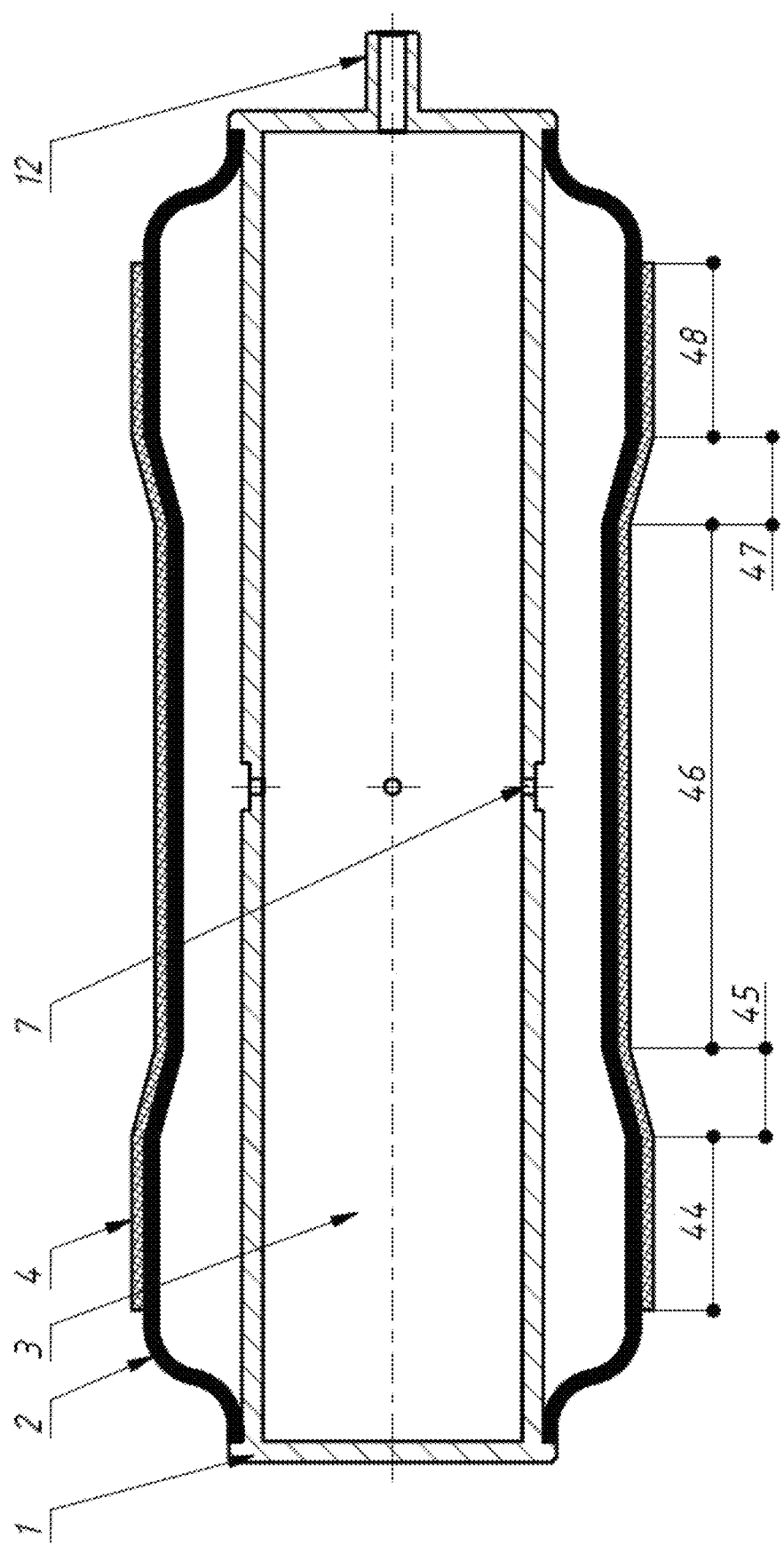
FIG. 3 shows the same view, without the pipeline.

FIGS. 2 and 3 show the device in the working condition. FIG. 3 does not show conventionally the pipes to be joined or the protective bushing. In the operating condition, the casing 4 (FIG. 3) has two hermetically sealing belts 44 and 48 located on the borders of the casing 4; a bed 46 in the middle part of the casing 4; and two ends-tightening belts 45 and 47 connecting the bed 46 to the hermetically sealing belts 44 and 48. The casing 4 represents a one-piece vacuum-tight envelope.

The hermetically sealing belts 44 and 48 are designed to provide primary insulation of the internal cavity of the annular space formed by the protective bushing 6 in the area of the welded joint 9, in the process of vacuum blowing, filling the cavity with a liquid compound and polymerizing the compound inside the annular space. The bed 46 is designed to insulate the internal surface of the protective bushing 6. The ends-tightening belts 45 and 47 are designed to provide hermetical sealing of the end portions of the internal cavity of the annular space for the welded joint 9 and for forming insulation with a filling compound.

Figure 4:
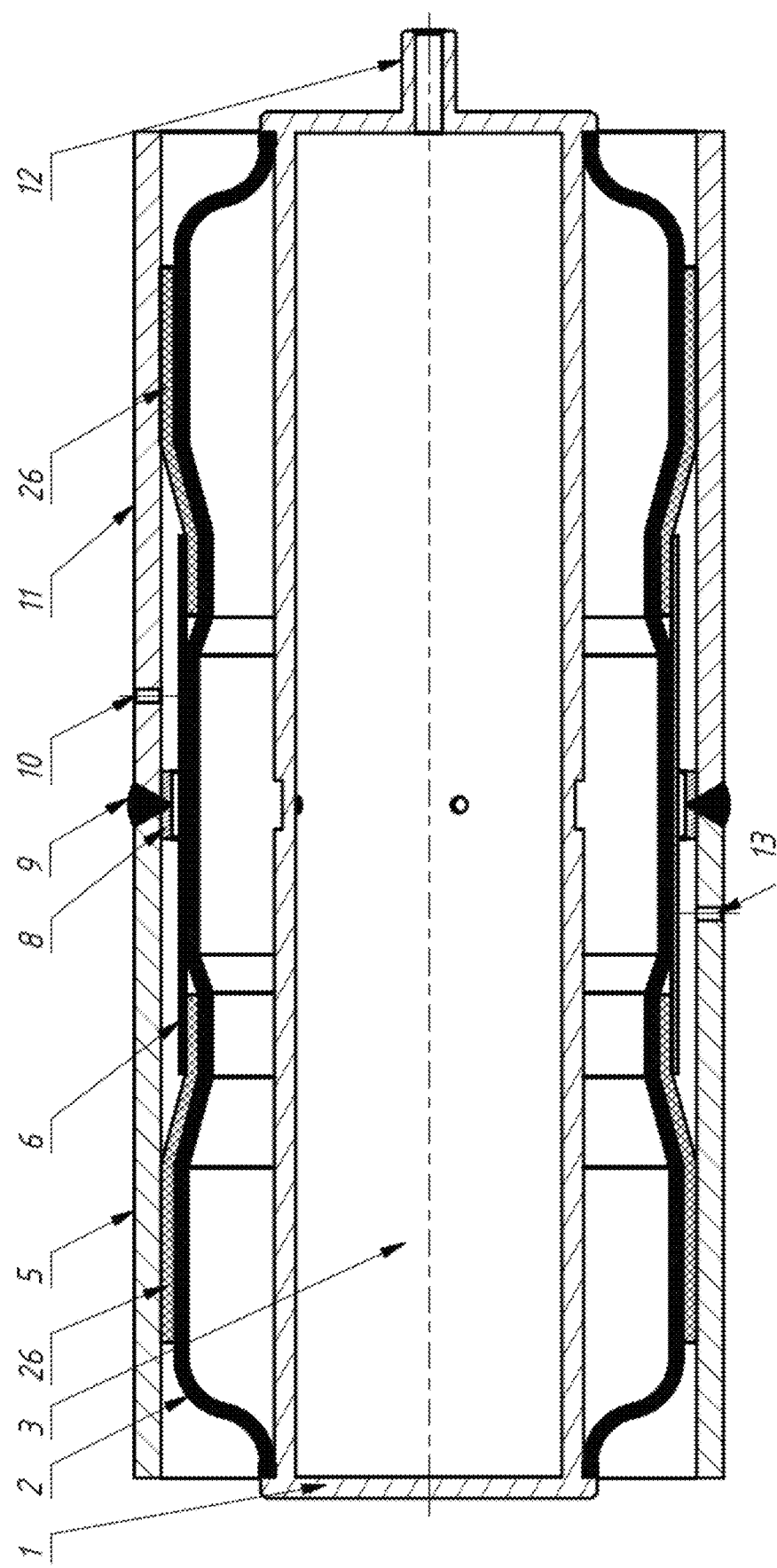
FIG. 4 is the device in accordance with the first embodiment with a combined casing.

During hermetical sealing of the welded joint via a nipple 12 (FIGS. 2, 3), compressed air is supplied into the internal cavity 3 of the case 1 of the power actuator. As the pressure increases in the internal cavity 3, the compressed air, through the gas-distribution holes 7, acts on the elastic working member 2 of the power actuator and fills it with air. In this case, the elastic working member 2 of the power actuator provides expansion of the casing 4. As the pressure increases in the power actuator, the bed 46 of the casing 4 is tightly applied to the internal surface of the protective bushing 6 insuring by the same a full insulation of the internal surface of the protective bushing 6. The hermetically sealing belts 44 and 48 of the casing 4, under the effect of the elastic working member 2 of the power actuator are tightly applied to the internal surfaces of the pipes 5, 11 of the joint while forming a hermetically sealed annular space between the internal surface of the vacuum casing 4 and the internal surfaces of the welded pipes 5, 11 with the welded joint. The ends-tightening belts 45 and 47 of the casing 4 provide for hermetical sealing of the annular end spaces at the borders of the protective bushing 6 and for forming a hermetically sealing vacuum-tight annular space between the protective bushing 6, the ends-tightening belts 45 and 47 of the casing 4, the internal surfaces of the pipes 5, 11 and the welded seam. In one of the pipes 5, 11, a hole 10 (FIG. 1) is made for air pumping out from the annular space and a hole 13 for supplying a liquid compound into the same. As a variant, the casing can be composed of two parts (FIG. 4). The two-part casing 26 differs from the entire casing by the absence of the middle part of the bed. In this case, the hermetical sealing of the annular space can be provided only by the device in accordance with the first embodiment of the invention when using a protective bushing 6 made of a vacuum-tight material, for example of steel or plastic. It is the most rational to use the two-part casing 26 when using very broad steel protective bushings 6.

Figure 5:
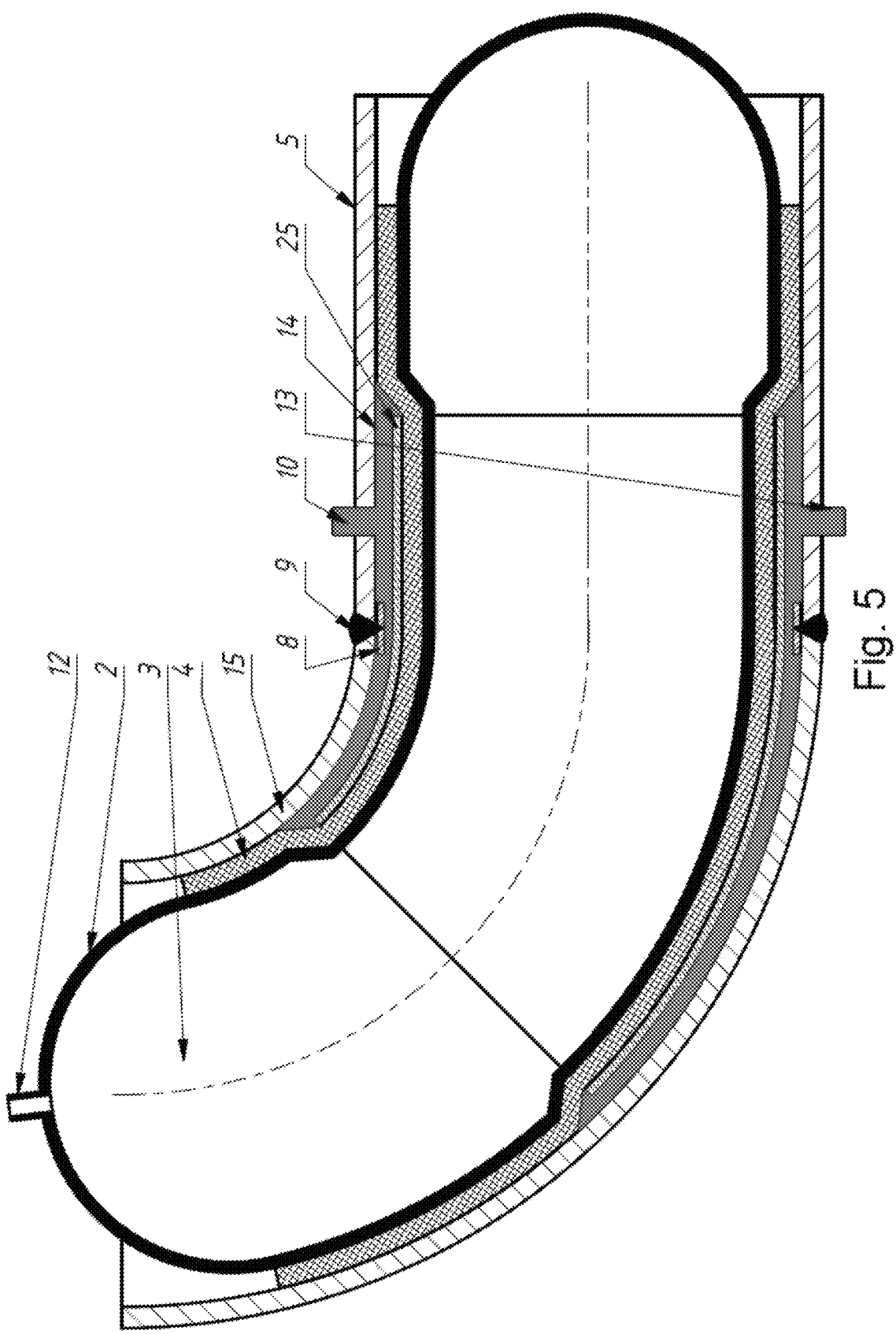
FIG. 5 is a device without a case for internal insulation of the welded joint in curvilinear portions of a pipeline.

A variant of making the device without a case (FIG. 5) is possible. For this, the working member 2 is made closed and having a nipple on the end. FIG. 5 shows a diagram of making the internal insulation of the welded junction of a straight pipe 5 with a branch 15. In this case, the formation of the internal annular space is carried out with the use of a protective bushing 25 having a particular profile. The use of a pneumatic or hydraulic power actuator without a case enables one to easily apply the device of the present invention for the internal insulation of a welded joint for curvilinear portions of a pipeline.

Figure 6:
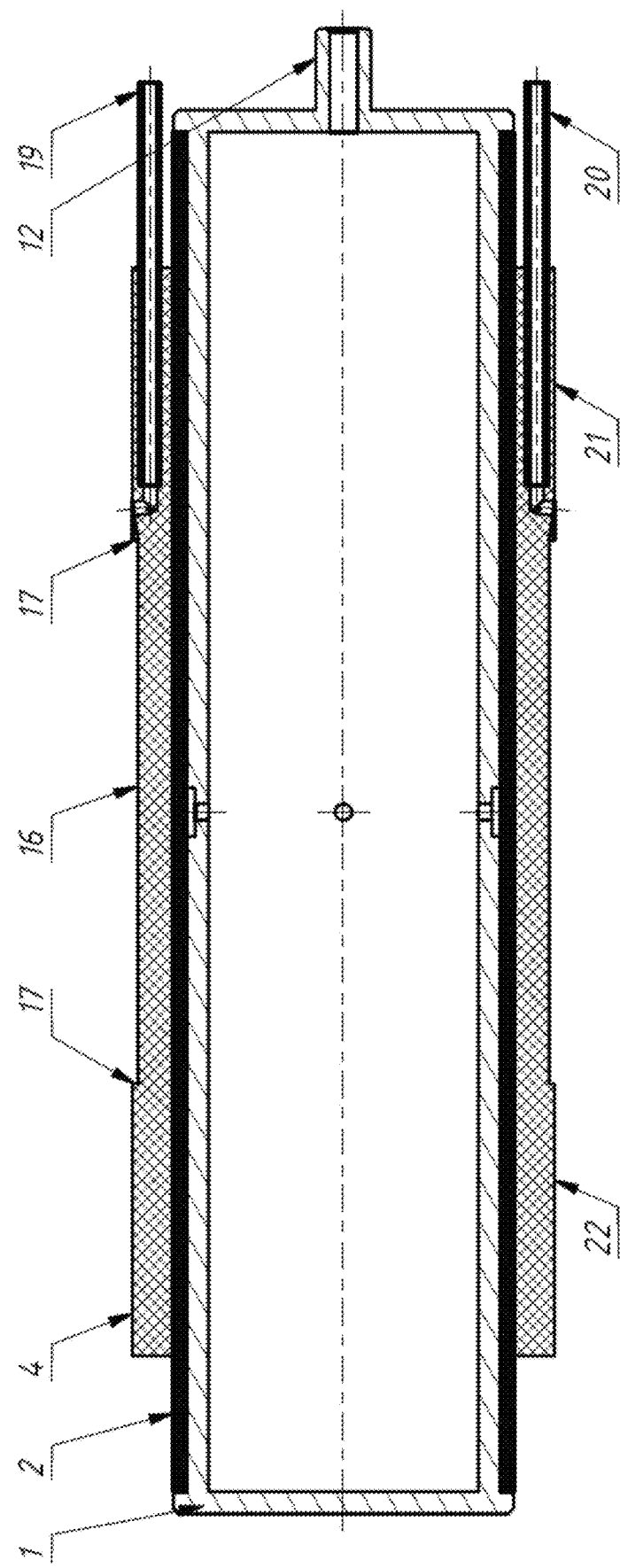
FIG. 6 is the device in accordance with the first embodiment with a casing the bed of which comprises two lateral stops, and with a unilateral insertion of channels for air pumping out and for supplying a compound inside the pipe, in its axial section.

FIG. 6 shows a device in accordance with the first embodiment of the present invention in which a particular bed 16 (an annular recess) is formed on the external surface of the casing 4 with two lateral stops 17 (annular steps). The width of the bed 16 is equal to the width of the protective bushing 6. When the working member 2 expands, the casing 4 expands as well and engages the protective bushing 6. The protective bushing completely lies down onto the bed 16 of the vacuum casing 4. In this case, both lateral stops 17 of the vacuum casing 4 engage the ends of the protective bushing 6. The protective bushing 6 is reliably settled to prevent any axial displacement.

Figure 7:
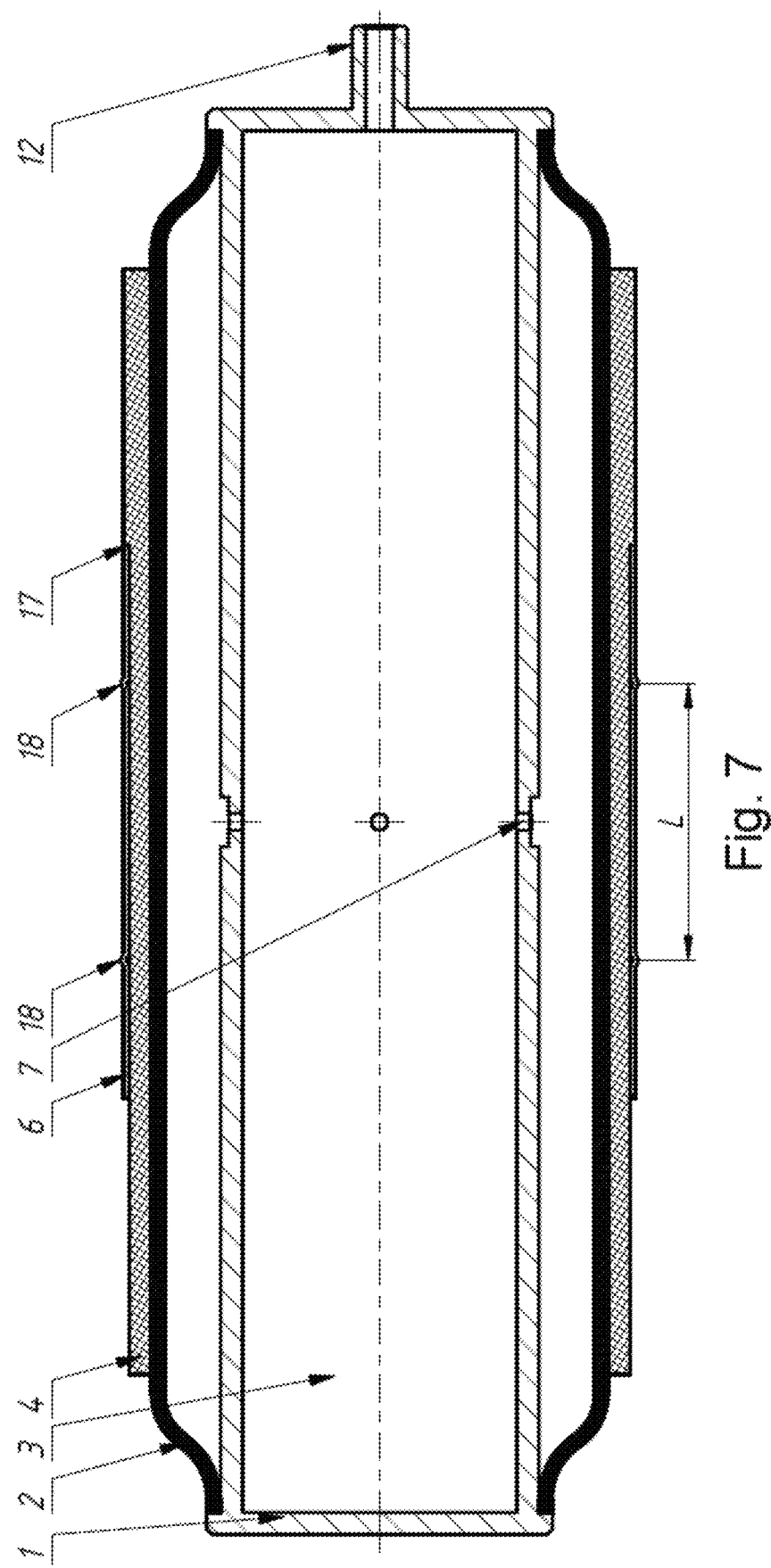
FIG. 7 shows the same view, with a casing the bed of which has one lateral stop.

FIG. 7 shows a different embodiment of the device where the casing 4 has one lateral stop 17 (an annular step) and a bed 16 open from one side. The vacuum casing 4 having one lateral stop 17 enables one to place protective bushings 6 of various widths onto the device. The devices for hermetical sealing with the casing 4 having a bed 16 and one or two lateral steps 17 make it considerably easier to provide tightness of welded joints of a pipeline where no protective bushings were previously mounted.

FIG. 6 shows the execution of the device according to the present invention with the unilateral insertion, inside the pipe, of a channel or of channels for air pumping out and of a channel or of channels for supplying a compound. Hermetically sealed inlets for tubes 19 and 20 are built-in into the casing wall near one end thereof, pass along the axis of the wall and form channels for air pumping out and for supplying a compound.

Figure 8:
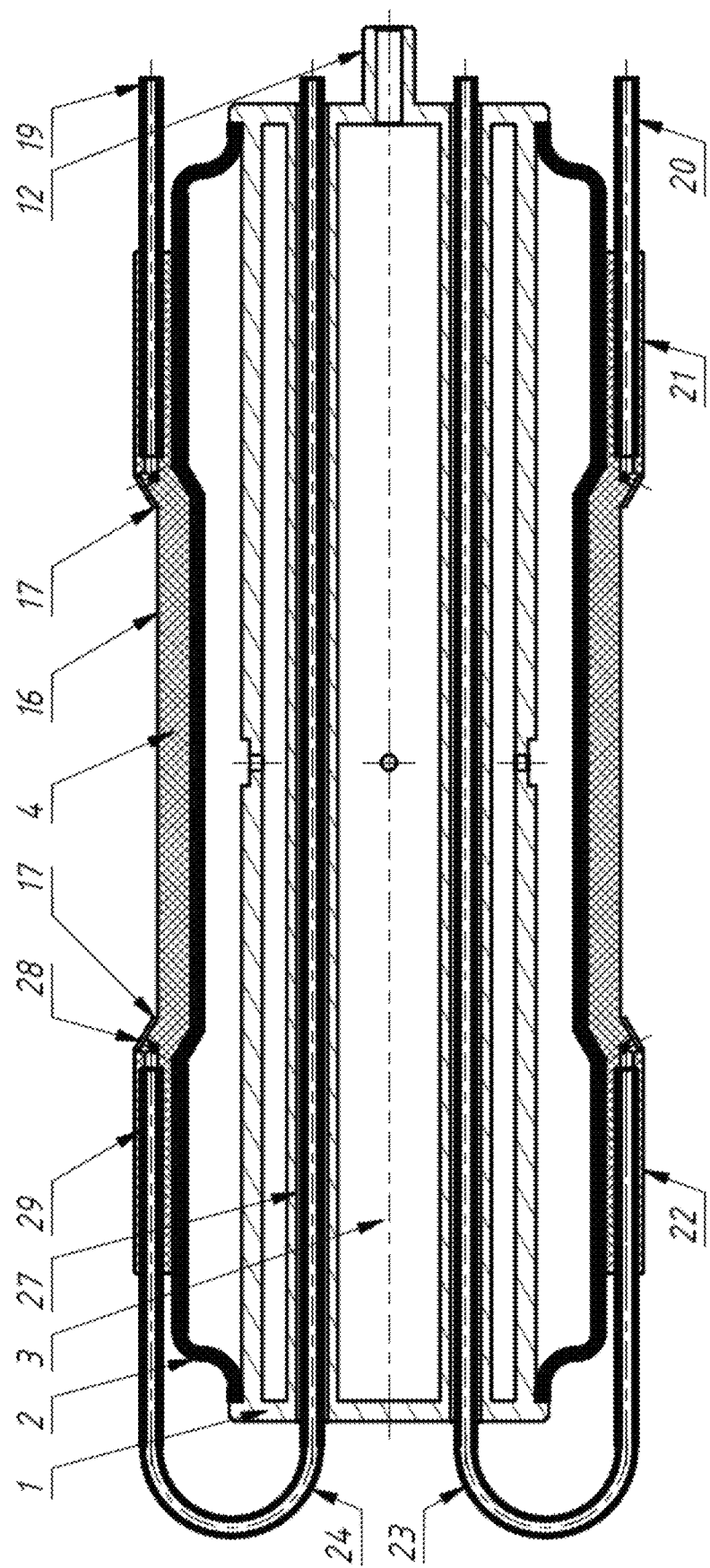
FIG. 8 is the device in accordance with the first embodiment with a bilateral insertion of channels for air pumping out and for supplying a compound inside the pipe, in its axial section.

FIG. 8 shows the device of the present invention in the working position with a two-directional insertion, inside the pipe, of a channel or of channels for air pumping out and of a channel or of channels for supplying a compound. The case 1 is made with built-in through channels 27 for laying tubes 23 and 24 with channels for air pumping out and for supplying a compound. The casing 4 has a bed 16 with lateral stops 17 for a precise positioning of the protective bushing 6 directly on the bed of the casing 4. Hermetically sealed inlets 29 for connecting the tubes 19, 20, 23 and 24 to the channels for air pumping out and for supplying a compound from both ends of the casing 4 are integrated into thickened hermetically sealing belts 21 and 22. The hermetically sealed inlets 29 connect the channels of the tubes 19, 20, 23 and 24 to the distribution surface grooves 28 located on the ends-tightening belts of the casing 4. Such a structure of the casing 4 provides for an easy and reliable tightness of the internal cavity of the annular space at the area of the welded joint as well as for vacuum processing and for a subsequent vacuum impregnating thereof without boring special technological holes in the walls of the pipes to be joined 5 and 11. Thanks to the expansion of the hermetically sealing belts 21 and 22 by the unclasping power actuator, they guarantee the insulation of the internal cavity of the annular gap. The connection of a vacuum pump and the supply of a liquid compound into the insulated cavity of the annular space are carried out via the channels of the tubes 19, 20, 23 and 24 that directly communicate with the hermetically sealed inlets 29 integrated into the hermetically sealing belts 21 and 22. To prevent an accidental shutting down of outlet holes from the hermetically sealed inlets 29 to the internal cavity of the annular space, distribution grooves 28 are arranged on the ends-tightening belts for connecting outlets holes of the hermetically sealed inlets 29 to the lateral stops 17 of the bed 16 in the casing 4. Thus, independently of the degree of pressing the hermetically sealing belts 21 and 22 against the inner walls of the pipes 5 and 11 to be joined, the channels of tubes 19, 20, 23 and 24 are connected in a reliable way via the hermetically sealed inlets 29 and the distribution grooves 28 to the annular end spaces between the ends of the protective bushing 6 and the internal walls of the tubes 5 and 11 to be joined. Said end spaces provide for air pumping out and for supplying a compound into the cavity of the annular space in the area of the welded joint.

Figure 9:
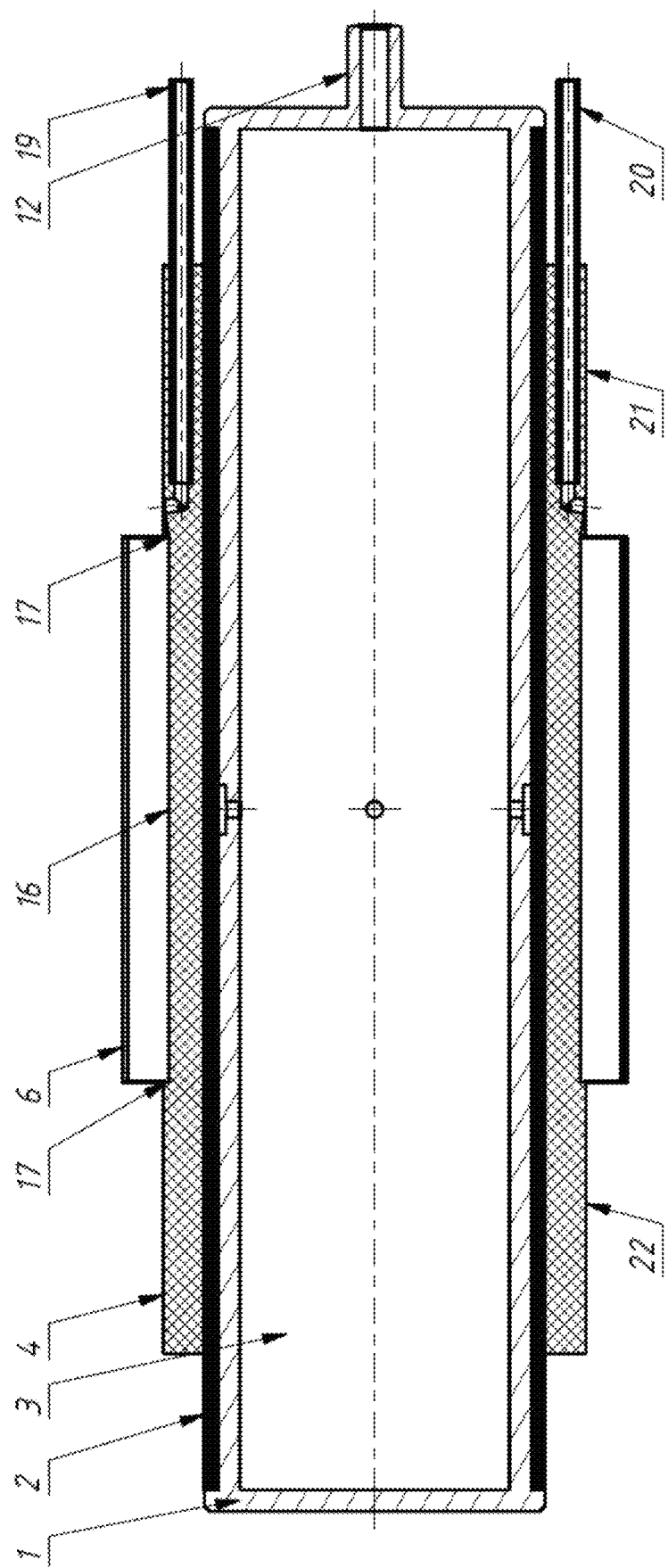
FIG. 9 is the device in accordance with the first embodiment while positioning the protective bushing above the bed of the casing.
Figure 10:
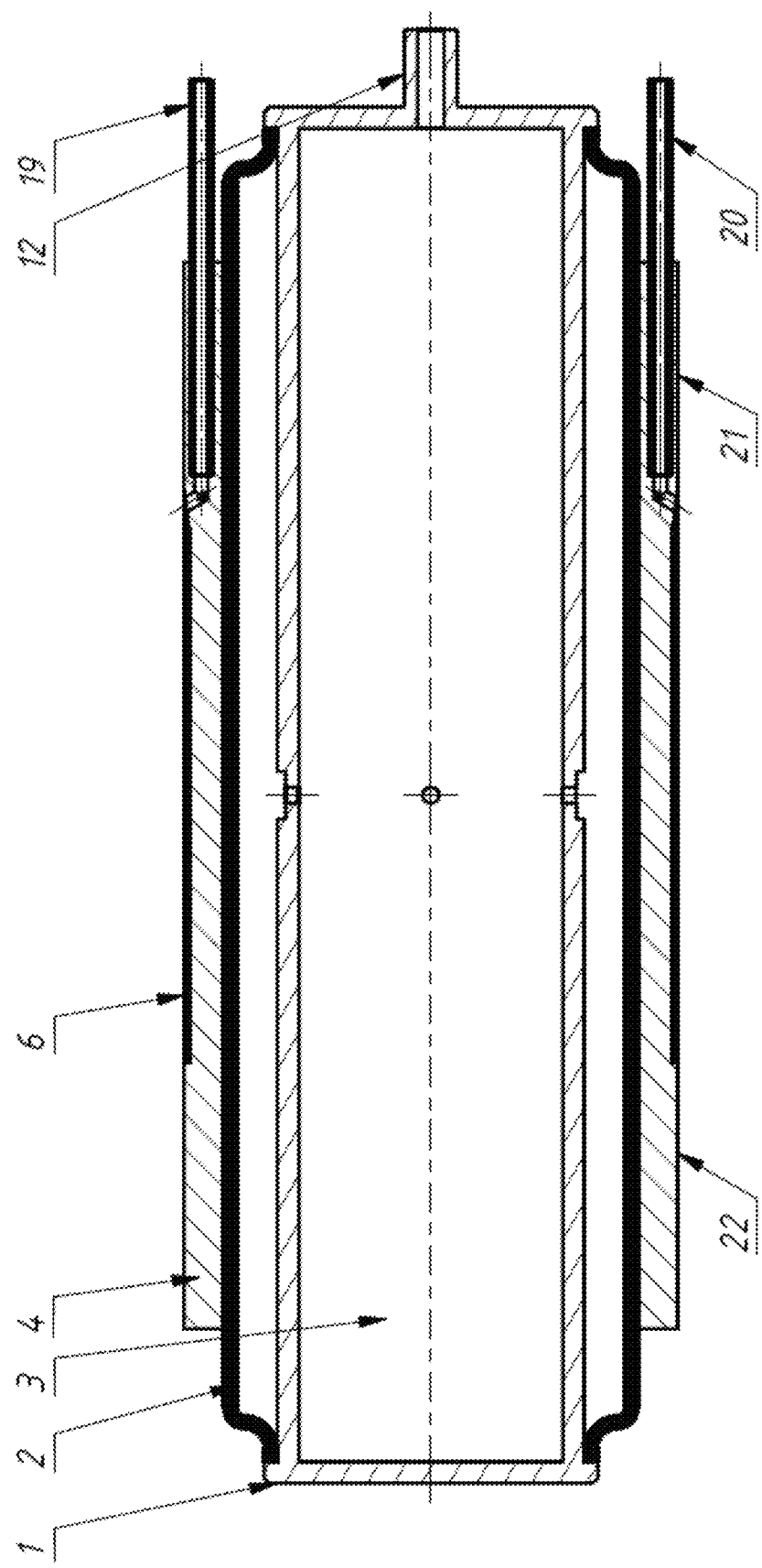
FIG. 10 shows the same view, in the position of gripping the protective bushing when the working member is expanded.
Figure 11:
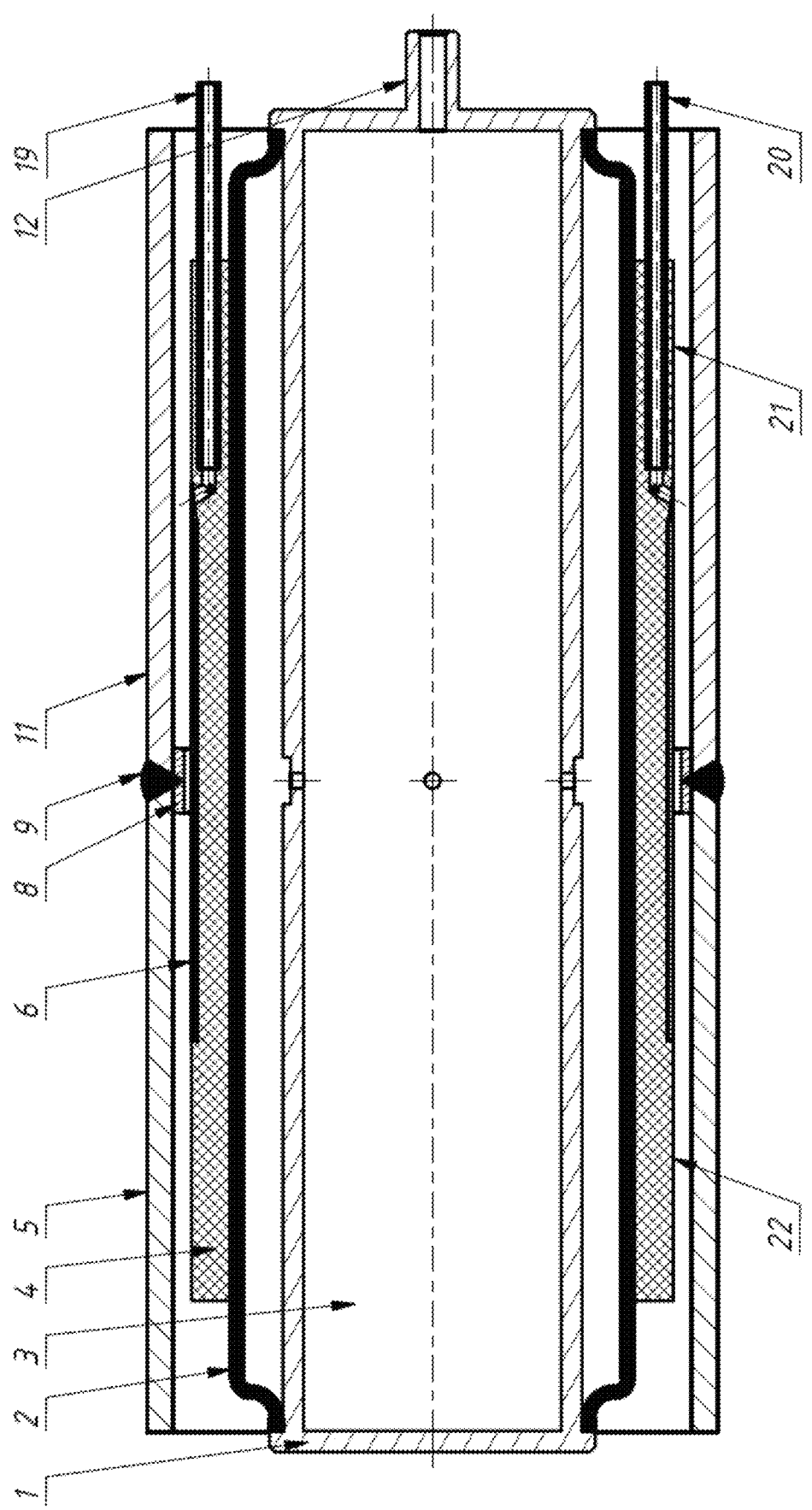
FIG. 11 shows the same view like in FIG. 9, inside the pipeline.

The operation of the device is identical to that of the device having a unilateral system of liquid compound supply and of connection to the vacuum system. When carrying out the sealing process at a welded joint, a protective bushing 6 is moved upon the casing 4 of the device and is positioned above the bed 16 while the bushing ends are mounted against the end stops 17 (FIG. 9). Compressed air is supplied into the power actuator via a nipple 12. The elastic working member 2 of the power actuator is inflated and the protective bushing 6 is clamped to be tightly set into the bed 16, the ends thereof being secured by the lateral stops 17 of the casing 4 (FIG. 10). It results in the shutdown of air supply. The device is introduced into the internal cavity of the welded joint 9 (FIG. 11). The device is centered together with the protective bushing 6 relative to the plant of the welded joint 9. Pressure is increased in the power actuator up to the nominal value (as a rule, up to 2.0-2.5 bars). The hermetically sealing belts 21 and 22 of the casing 4 are tightly pressed against the inner surfaces of the pipes 5, 11 of the welded joint. It results in the formation of a hermetic vacuum-tight annular space between the protective bushing 6 and the internal surfaces of the pipes 5, 11. When pressure is fed to the power actuator, the protective bushing 6 is automatically centered relative to the axis of the pipeline, which provides for a uniform annular space between the walls of the protective bushing 6 and the walls of the pipes 5, 11. A guaranteed hermetically sealed entry is provided through the end spaces on both ends of the protective bushing 6 for connecting a vacuum pump and for supplying a liquid compound. In this case, there is no need to perforate technological holes in the walls of the pipes 5, 11. Besides, while carrying out the process of the internal isolation of the welded joint 9, the device is completely separated from the environment which drastically improves the conditions of hermetical sealing for the welded joint 9 at any weather conditions. The system of feeding the channels for air pumping out and the channels for supplying a compound inside the pipes enables one to provide tightness of a pipeline welded joint both at open sites (on land) and at hidden places (under water and in soil).

Figure 12:
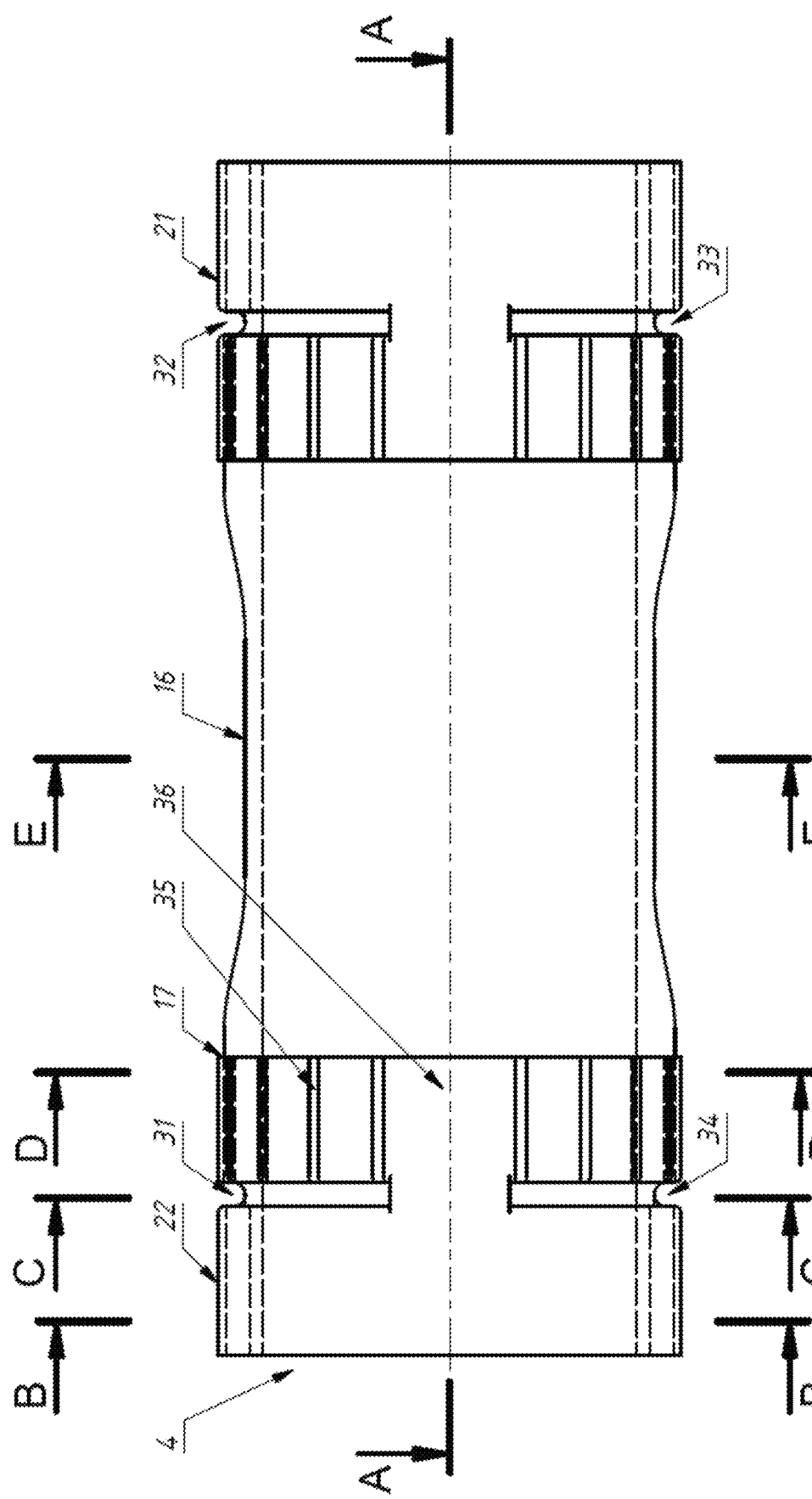
FIG. 12 shows the casing in accordance with the first embodiment for protective bushings having a streamlined shape and presenting distribution and longitudinal grooves.
Figure 15:
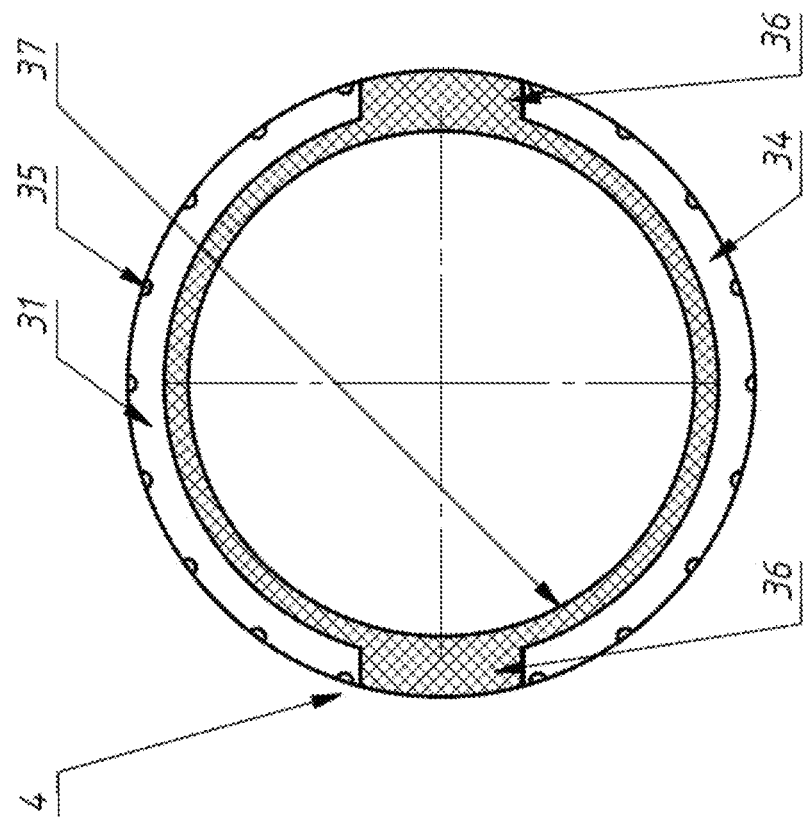
FIG. 15 shows a C-C section of FIG. 12.
Figure 14:
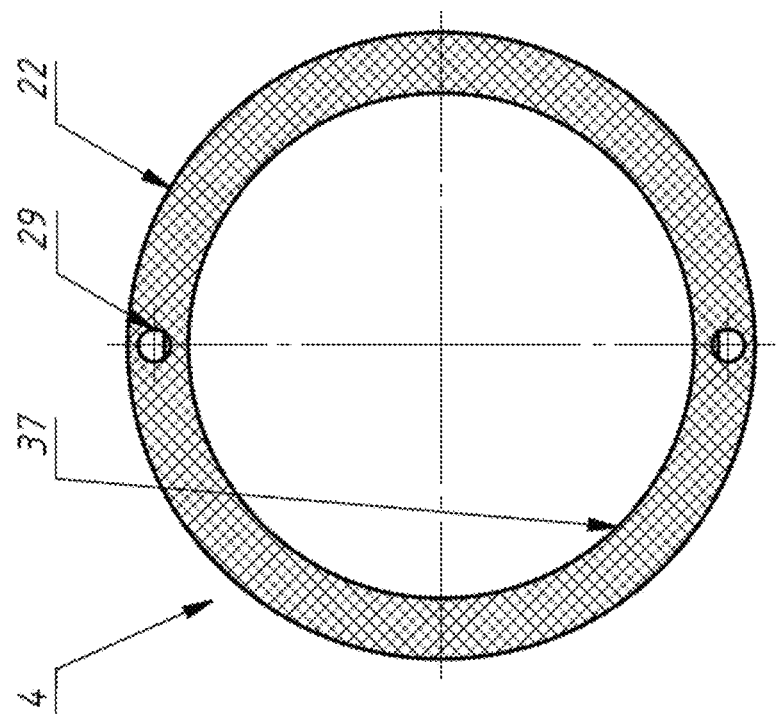
FIG. 14 shows a B-B section of FIG. 12.
Figure 17:
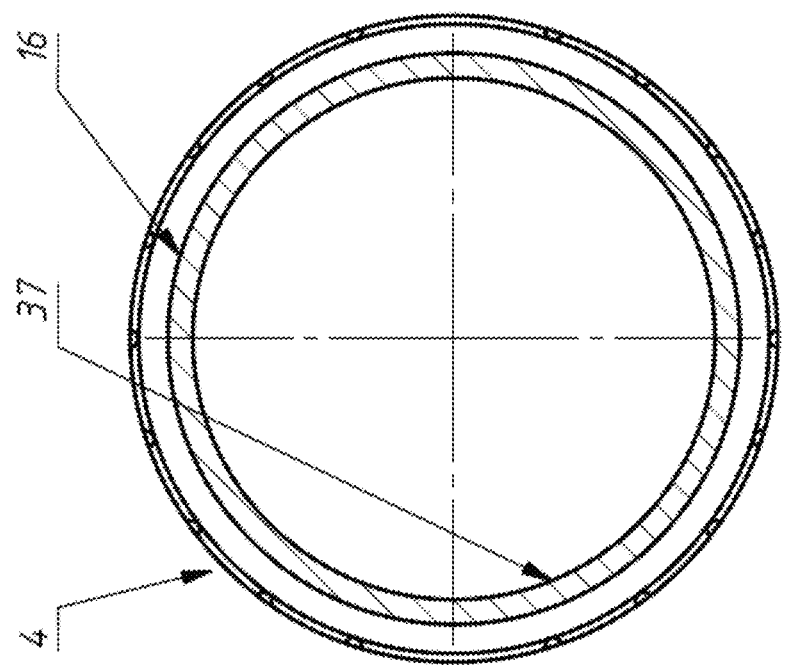
FIG. 17 shows an E-E section of FIG. 12.
Figure 16:
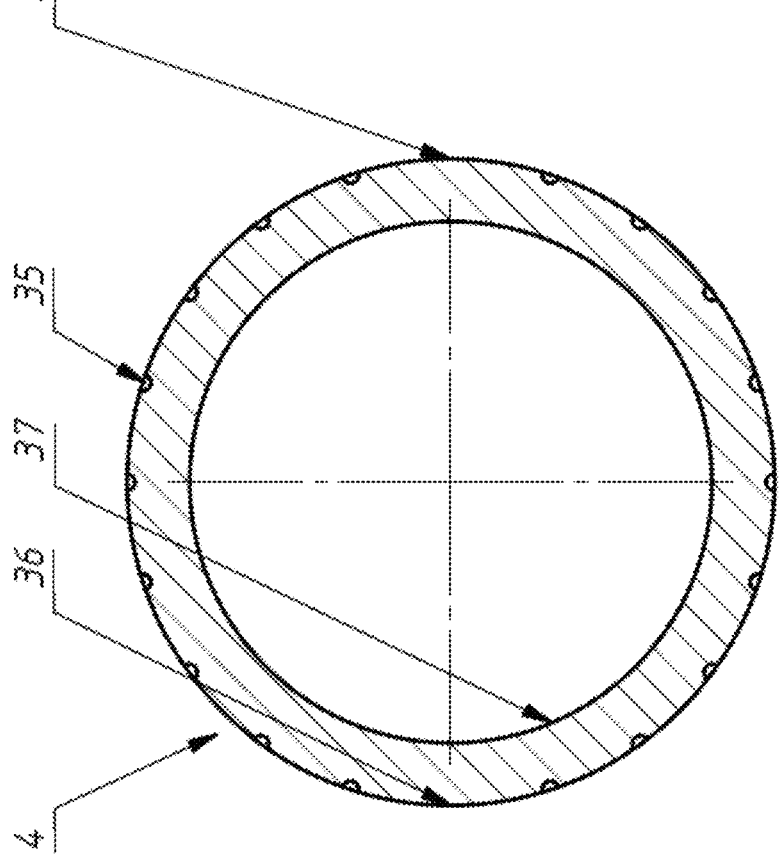
FIG. 16 shows a D-D section of FIG. 12.

FIG. 12 shows a general view of the casing 4 with a bed 16 of a particular profile for protective bushings of a streamlined shape with lateral stops 17. The protective bushing with a streamlined shape has smooth expansions (not shown in Figures). The profile of the bed 16 of the casing 4 repeats the profile of the protective bushing. This casing 4 is designed for clamping the protective bushing outside the cavity of the pipe with a precise positioning thereof on the bed 16 of the casing 4, for transporting the protective bushing to the welded joint to be hermetically sealed, for centering the protective bushing relative to the plane of the welded joint, for primary hermetical sealing of the annular space, for providing distributed feeding for channels to pump out air and for channels to supply a compound to the internal cavity of the annular space by the internal cavity of the pipeline. The main particularity of the process of hermetical sealing for the welded joint with a protective bushing of a streamlined shape and with the internal entries for connecting a vacuum pump and for supplying a compound is represented by very narrow annular end spaces on the borders of the bushing. It considerably reduces the section of the local supply of vacuum and of compound via the integrated hermetically sealed inlets. In order to increase the flow section for supplying vacuum and compound via the narrow annular end space between the protective bushing and the internal surfaces of the pipes in the structure of the casing 4 (FIG. 11), particular distribution collectors such as arched grooves 31, 32, 33, 34 (or annular grooves) and multiple distributed superficial capillary-kind longitudinal grooves 35 have been executed. The distribution grooves 31, 32, 33, 34 are located at the border between the hermetically sealing belts 21, 22 of the vacuum casing and the ends-tightening belts (FIG. 12). The longitudinal grooves 35 are located directly on the external surface of the ends/tightening belts. In this case, the internal channels of the hermetically sealed inlets 29 directly communicate with the distribution grooves 31, 32, 33, 34 (FIG. 18). In turn, the multiple longitudinal grooves 35 provide for the connection of the distribution grooves 31, 32, 33, 34 with the ends of the protective bushing 6 and, respectively, with the end spaces on the borders of the bushing 6. Thanks to a great number of distributed longitudinal grooves 35 (FIG. 16), the needed flow section of the feed lines directly to the end space is achieved when the use is made of protective bushings of streamlined shape. On the casing 4, at the area of the distribution grooves 31, 32, 33, 34 and of the ends-tightening belts, two longitudinal separating bridges 36 made as smooth portions of the cylindrical surface of the casing (FIG. 12 and FIG. 15) on each side. The bridges 36 provide for the insulation of all the distribution grooves and inlets (FIG. 15). This structure of the casing 4 enables one to get a completely independent control of the place for connecting channels to pump out air and to supply a compound to the annular space at the area of the welded joint, and, respectively, to considerably ease up the control of the whole process of hermetic sealing for a welded joint, for example, when sealing a welded joint on an inclined or vertical portion of the pipeline. The vacuum system is always connected to higher points of a feed line while the supply of a compound is carried out via lower points of a feed line. FIG. 13 shows a longitudinal section of the casing at the area of longitudinal separating bridges 36, which demonstrates that the hermetically sealing belts 21, 22 and the separating bridges 36 completely separate the upper 31, 32 and the lower 33, 34 arched distribution grooves, which prevents any transfer of the medium between them. In turn, the bed 16 with the end stops 17 tightly applied to the internal surface of the protective bushing 6, separate the left part of the distribution grooves from the right side (FIG. 13 and FIG. 17). Thus, a possibility of an independent connection of the vacuum system and of the compound supply is provided to any area that is more preferable for a considered case of providing tightness. FIG. 14 shows a cross section of the hermetically sealing belt 22 of the casing 4 with integrated internal hermetically sealed inlets 29. The hermetically sealing belt 22 (FIG. 14) has a one-piece section with integrated elastic or rigid hermetically sealed inlets 29, that provides for the same shape of the external surface of the hermetically sealing belt 22 when a welded joint is processed to provide hermetical sealing. The external surface of the hermetically sealing belt 22 and its internal surface 37 have a one-piece cylindrical shape. When supplying pressure into the working cavity 3 of the power actuator up to the nominal value, a tight application of the hermetically sealing belts 21, 22 is provided on the whole surface of their external surface against the walls of the pipes 5, 11 at the area of the welded joint 9, and, respectively, a vacuum-tight annular space is formed at the area of the welded joint. The provision of channels for air pumping out and of channels for supplying a compound via the hermetically sealed inlets 29 in the casing 4 enables one to abandon the idea of technological holes in the walls of the pipes 5, 11 to be joined, which considerably reduces the cost of the process of internal insulation for a welded joint and, at the same time, considerably widens the application possibility of the insulation process both for underwater and underground pipelines. Besides, it eliminates in practice the effect of weather conditions on the process of tightness provision for a welded joint. In this case, the hermetically sealed inlets 29 (FIG. 14) do not have any negative effect on the primary insulation or on the vacuum evacuation or the vacuum impregnation of the annular space cavity for a welded joint.

Figure 19:
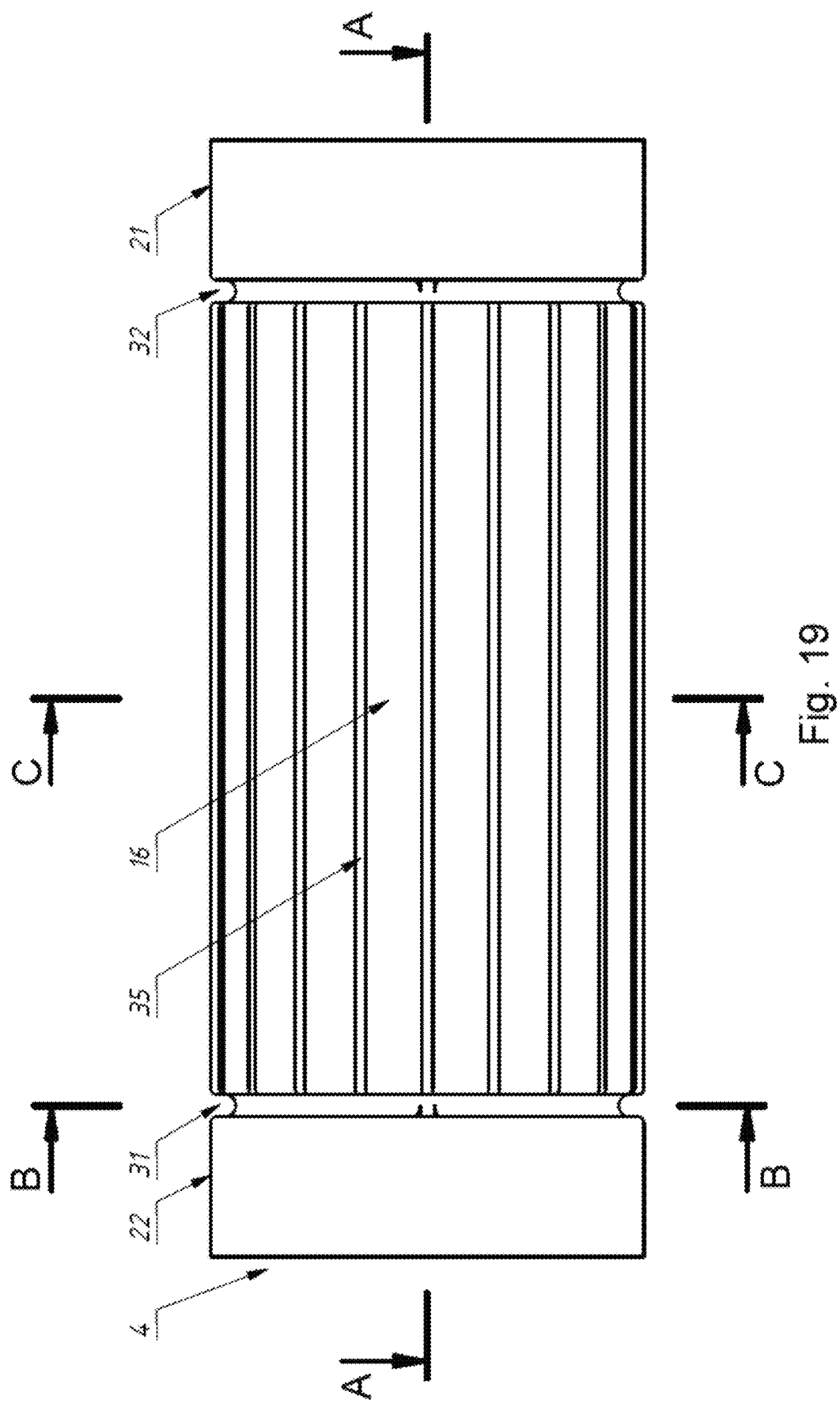
FIG. 19 shows the casing of the device in accordance with the first embodiment for a previously mounted protective bushing with arched distribution grooves.
Figure 22:
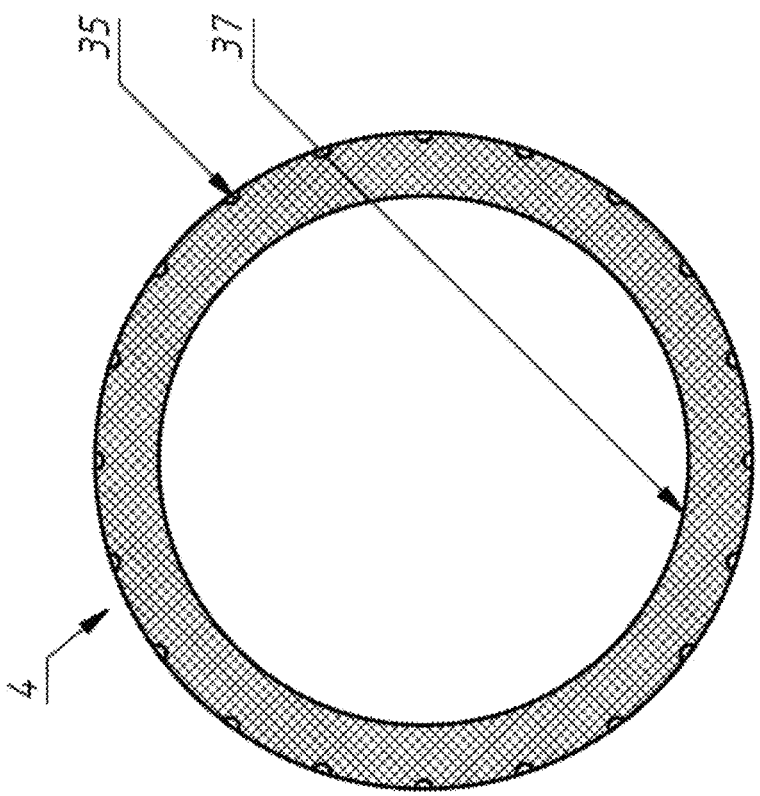
FIG. 22 shows a C-C section of FIG. 19.

FIG. 19 shows a casing 4 of the device according to the invention, designed to operate with a previously mounted protective bushing (during the pipeline mounting process), with air pumping out and liquid compound supply from inside the pipe via end annular spaces between the ends of the bushing and the walls of the welded pipes. The casing 4 has two hermetically sealing belts 21, 22 with integrated hermetically sealed inlets 29 (FIG. 20) for air pumping out and for supplying a compound, two annular distribution grooves 31, 32, a lengthened bed (FIG. 19) combined with the ends-tightening belts, and longitudinal grooves 35 formed on the whole length of the bed 16 and of the ends-tightening belts. The distribution grooves 31 and 32 (FIGS. 19 and 21) are interconnected by longitudinal grooves 35 (FIGS. 20 and 22). The internal surface 37 of the casing 4 that contacts the power actuator has a smooth cylindrical shape. In the process of tightening the welded joint with the use of a previously mounted protective bushing, the described structure of the casing does not require a precise positioning of the device for the internal insulation relative to the welded joint plane. In this case, the main condition is that the lengthened bed 16 of the casing 4 overlaps completely the protective bushing.

Figure 21:
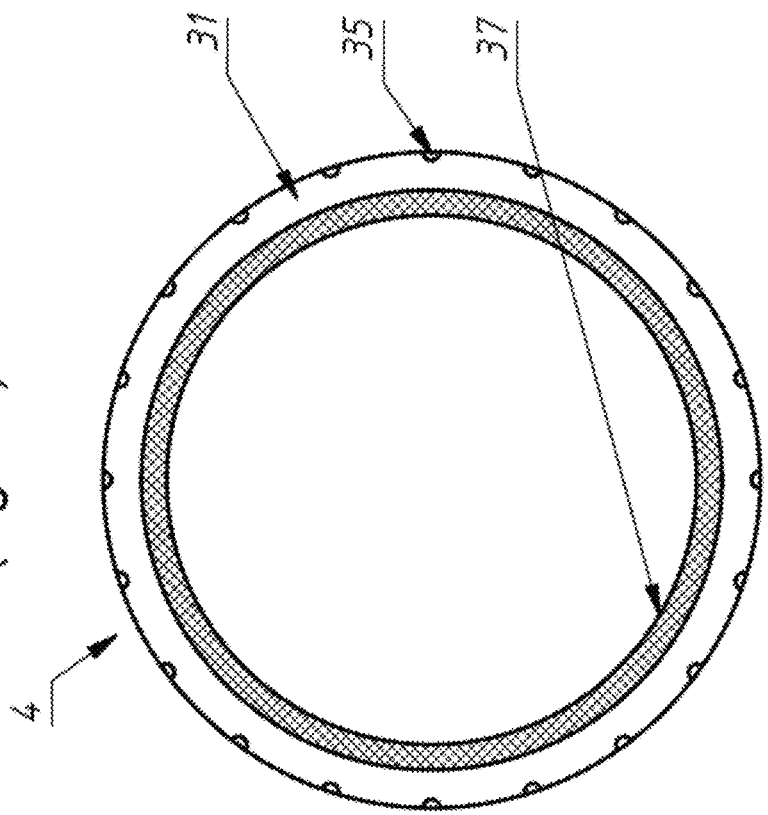
FIG. 21 shows a B-B section of FIG. 19.

The device for the internal insulation of a welded joint having a casing shown in FIG. 19 operates as follows. The casing 19 is put onto the elastic working member of the power actuator. Flexible tubes for air pumping out and for a compound supply are connected to the hermetically sealed inlets 29 of the casing 4. The device for the internal insulation of a welded joint is inserted into the cavity of the pipeline and is moved to the welded joint to be tightened with a previously mounted protective bushing secured against the longitudinal displacement by the protective bushing. Coarse centering of the device relative to the welded joint plane is carried out by comparison of the distance from the end of the closest pipe of the pipeline to the end of the device (measured inside the pipeline) and to the welded joint plane (measured on the outside of the pipeline). The needed precision of the device positioning is determined by the length of the bed 16 of the casing 4 that can be manufactured with any necessary length. An extremely high length of the casing is not rational since a higher length of the casing requires a higher consumption of liquid compound. After positioning the device providing tightness of the welded joint, pressure is fed to the power actuator, and the casing 4 is tightly applied to the walls of the protective bushing and to the walls of the pipes. The hermetically sealing belts 21 and 22, when pressed against the pipe walls provide for a guaranteed insulation of the annular space cavity for the welded joint. The bed 16 of the casing 4 with the ends-tightening belts is tightly applied to the surface of the protective bushing and to the walls of the pipes. In this case, the longitudinal grooves 35 located on the casing 4 and pressed against the protective bushing and the pipe walls form closed capillary channels. These channels follow from one distribution groove 31 (32) to another one. The capillary channels (FIG. 20) provide for connection between the distribution grooves 31 and 32 and both annular end spaces between the ends of the bushing and the walls of the pipes. In this case, the necessary flow section is provided thanks to a high number of the longitudinal grooves 35 uniformly distributes along the casing perimeter (FIG. 21, 22). Air is pumped out from the annular space cavity via the hermetically sealed inlets 29. The tightness is checked on the basis of the rate of pressure increase in the annular space cavity when the channel of air pumping out is closed. The liquid compound is supplied under vacuum into the annular space via the lower hermetically sealed inlets 29. The liquid compound is polymerized until the condition of stopped fluidity of the material. Pressure is released at the power actuator. The elastic working member 2 of the power actuator is contracted and induces contraction of the casing 4. The casing 4 made of an anti-adhesive material easily comes off from the surface of the protective bushing of pipe walls and from the partially hardened compound. The device is extracted from the pipe cavity. In this case, the compound pours being in the initial stage of cure are easily detachable and do not impede the extraction of the device from the pipeline.

Figure 26:
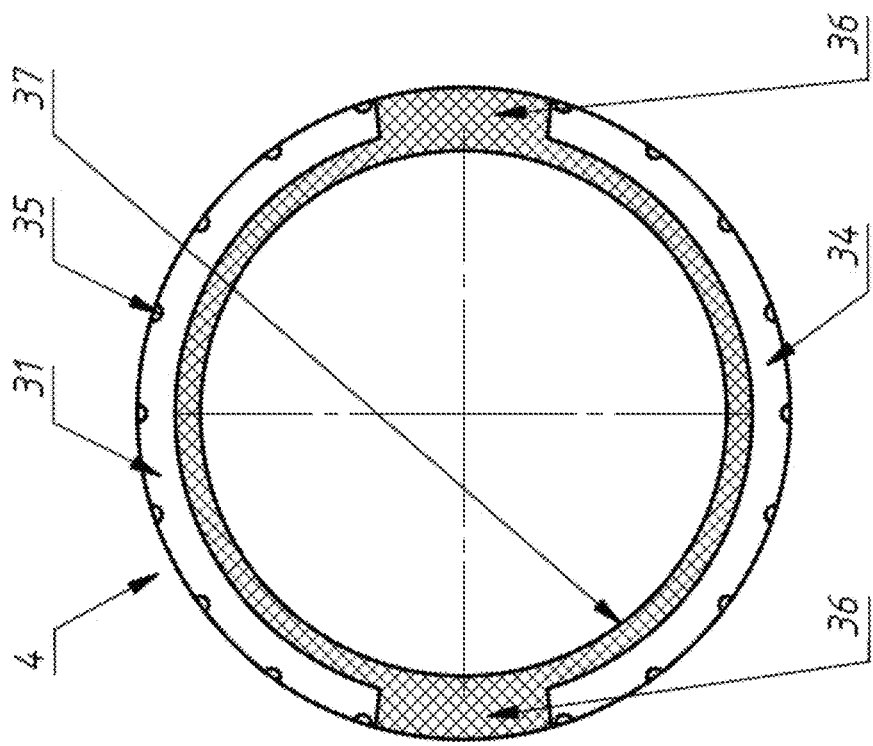
FIG. 26 shows a C-C section of FIG. 23.
Figure 25:
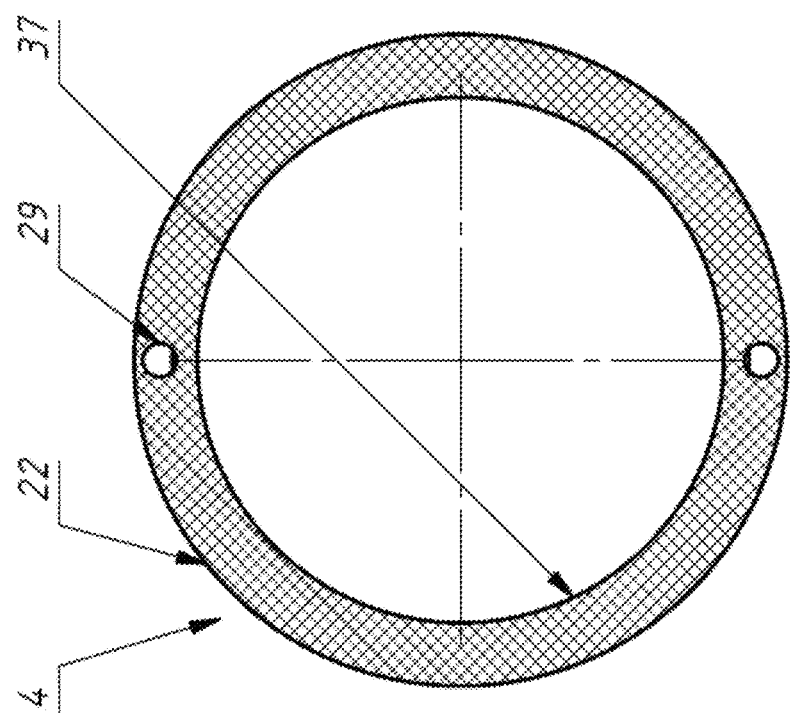
FIG. 25 shows a B-B section of FIG. 23.
Figure 28:
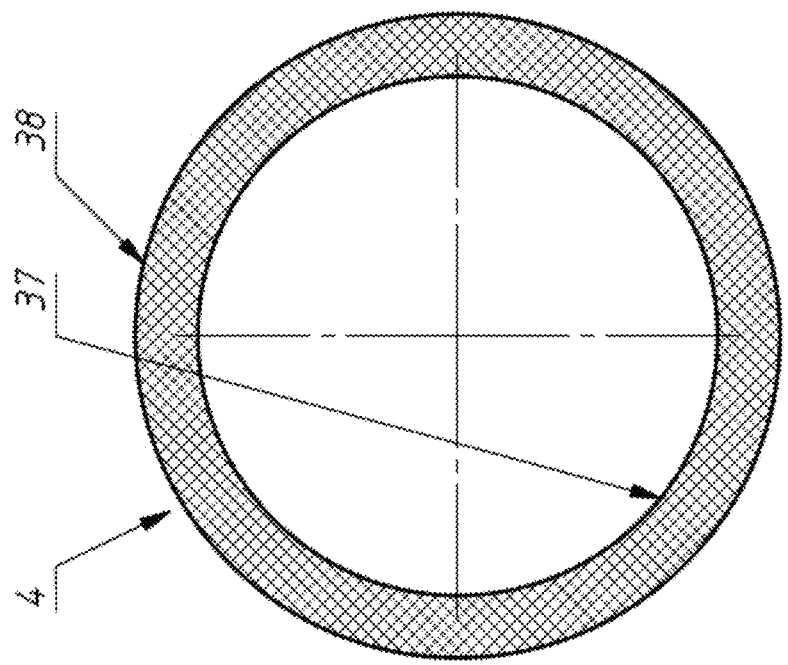
FIG. 28 shows an E-E section of FIG. 23.
Figure 27:
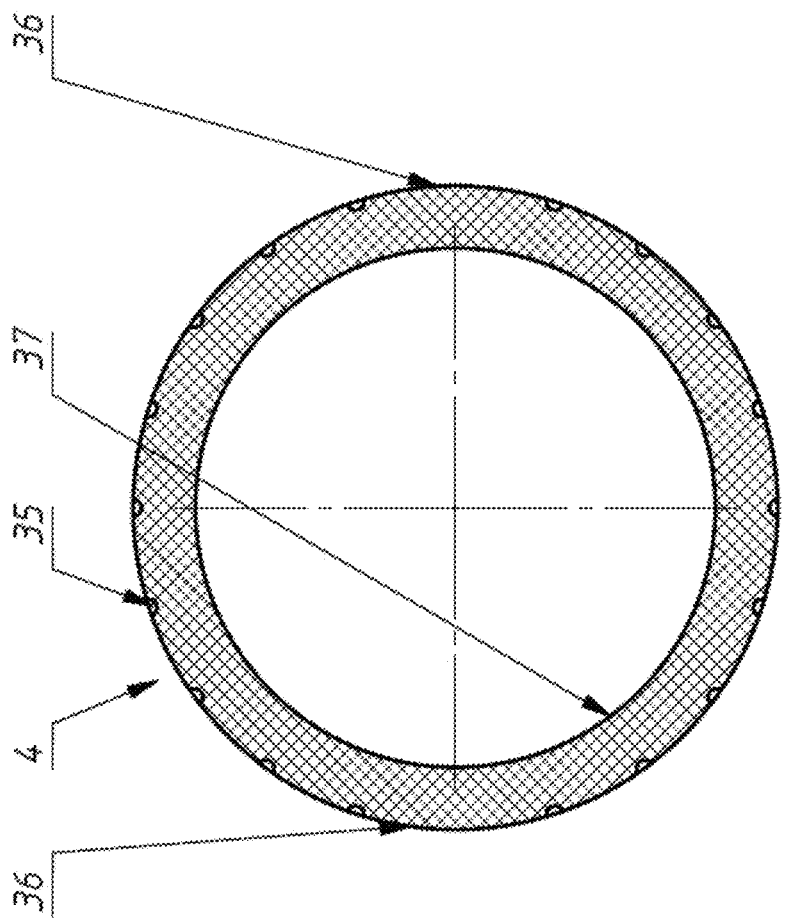
FIG. 27 shows a D-D section of FIG. 23.
Figure 30:
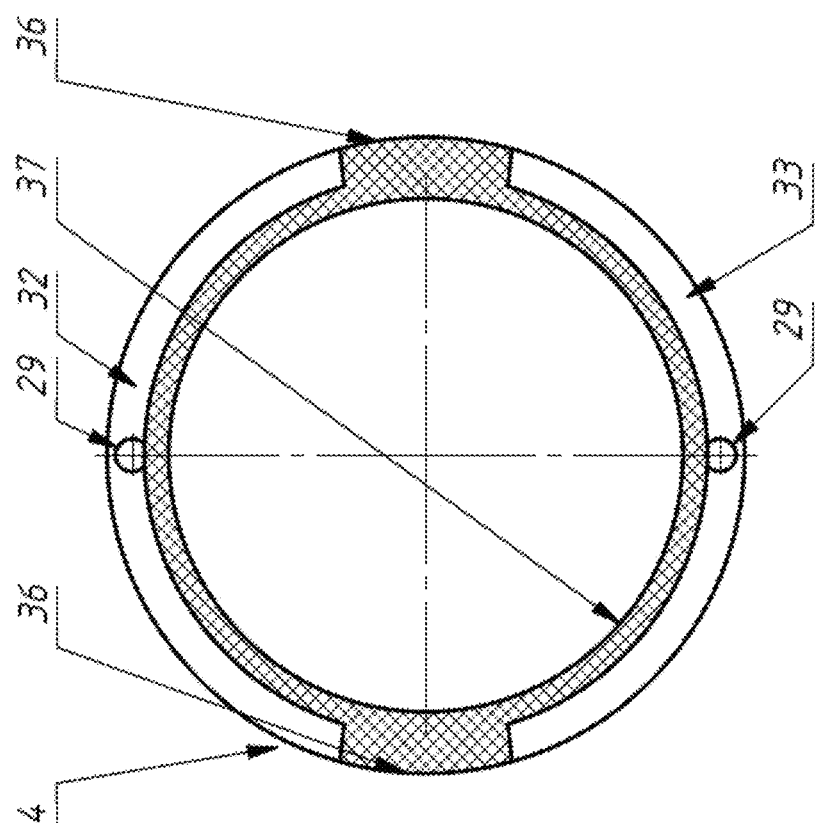
FIG. 30 shows a G-G section of FIG. 23.
Figure 29:
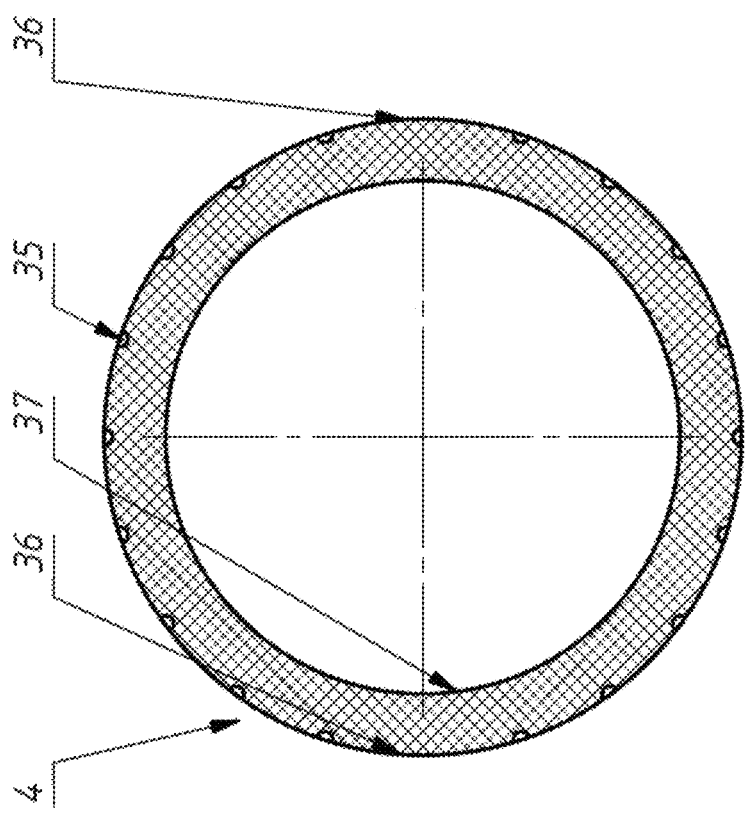
FIG. 29 shows a F-F section of FIG. 23.
Figure 31:
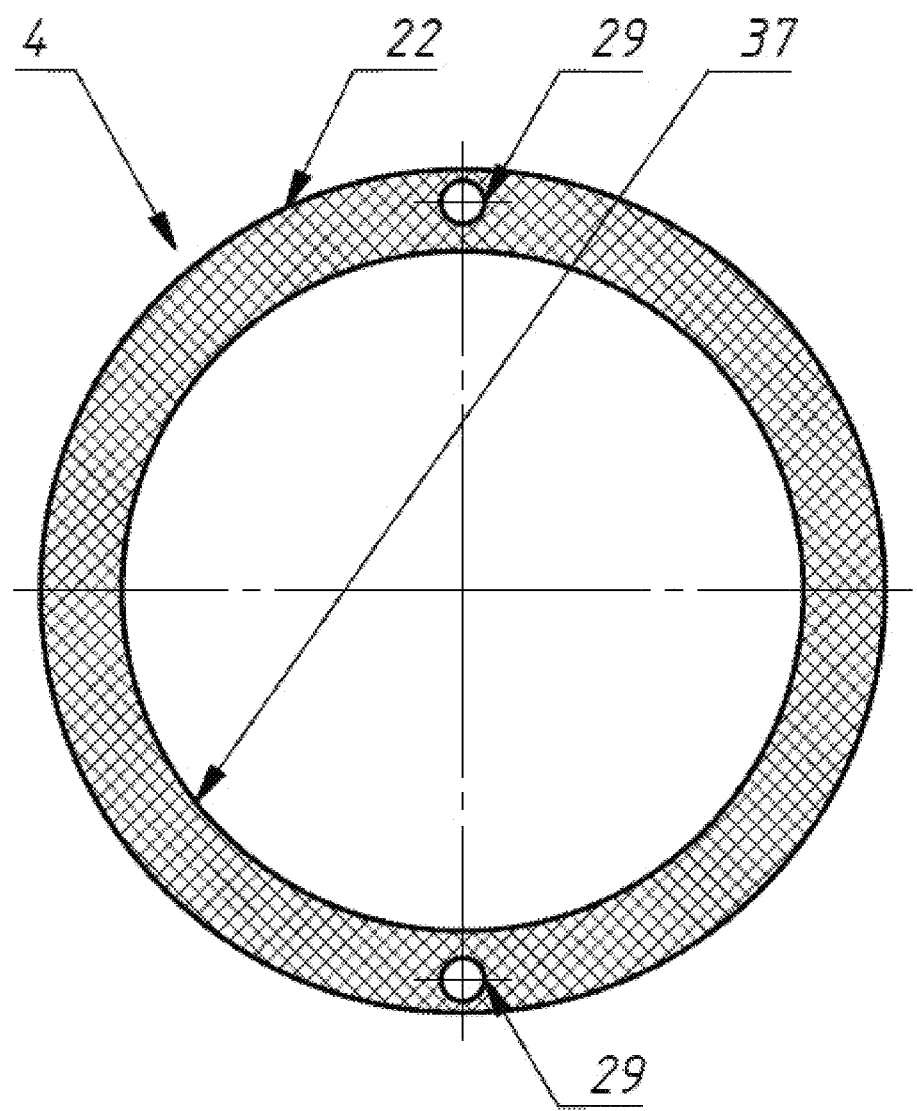
FIG. 31 shows a H-H section of FIG. 23.
Figure 32:
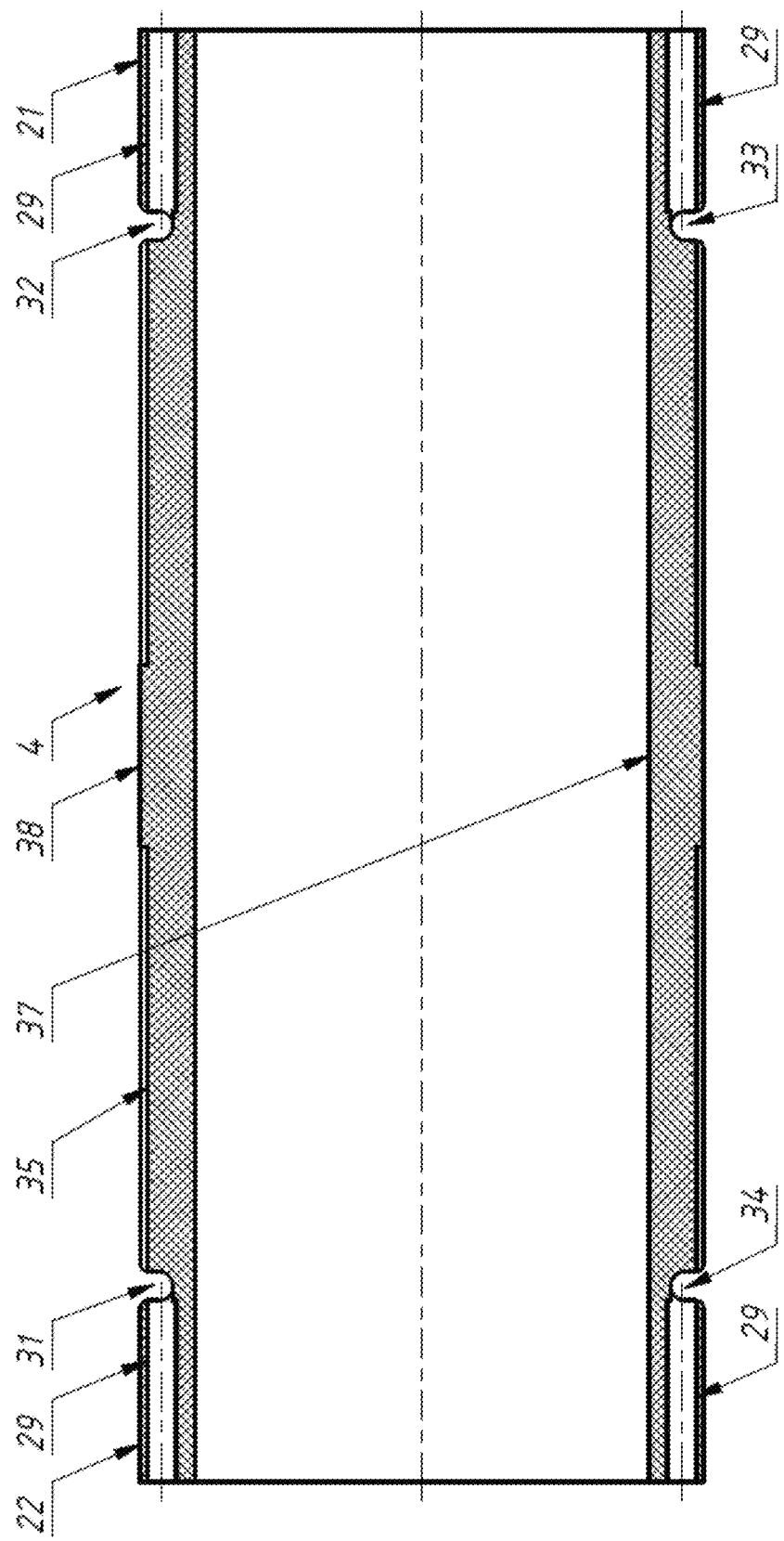
FIG. 32 shows a J-J section of FIG. 24.

In order to provide an efficient control of the process of vacuum impregnation for the pipeline welded joint with liquid compound, the casing 4 shown in FIG. 19 can be improved by the manufacture of both longitudinal and transversal bridges on the grooves thereof made as smooth portions of cylindrical surface of the casing 4. FIG. 23 shows a casing 4 for the device for the internal insulation of a welded pipeline joint having a distributed system of connection to the vacuum system and a system of liquid compound supply. The casing shown in FIG. 23 has two hermetically sealing belts 21 and 22, four hermetically sealed inlets 29 (FIGS. 25, 31, 32), four arched distribution grooves from which grooves 31 and 34 are on the left (FIG. 26) and two grooves 32 and 33 are on the right (FIG. 30) and two longitudinal bridges 36 (FIGS. 23, 24). Between the distribution collectors 31, 34, 32, 33 and the transversal annular bridge 38, multiple longitudinal grooves 35 are formed (FIG. 23, 26, 27, 29, 32). The construction of the casing 4 provides for the insulation of the channels for air pumping out and for compound supply. It enables one both to carry out air pumping out and to supply liquid compound into the annular cavity practically at any point of the annular end space. The distributed feed line of the air pumping out channels and of compound supply channels enables the provision of an efficient control of the process of impregnating the annular space cavity at the area of the welded pipeline joint and the internal insulation of pipeline portions located practically at any space point.

The operation of the device with the casing 4 shown in FIG. 23 is identical to the operation of the device having a casing shown in FIG. 19. As drawbacks of the casing 4 having a transversal annular bridge 38 (FIGS. 23, 32), we mention some limitation of the device positioning precision relative to the welded seam 9 plane that should not be lower than a half-length of the protective bushing or should be between ±60 to ±90 mm. In practice, this limitation has no any real effect since the usually achieved positioning precision without taking any special measures is between ±10 and ±20 mm and is easily provided in the field conditions with the use of common measuring means. When using a laser range finder, the achieved precision is ±1 mm.

Figure 33:
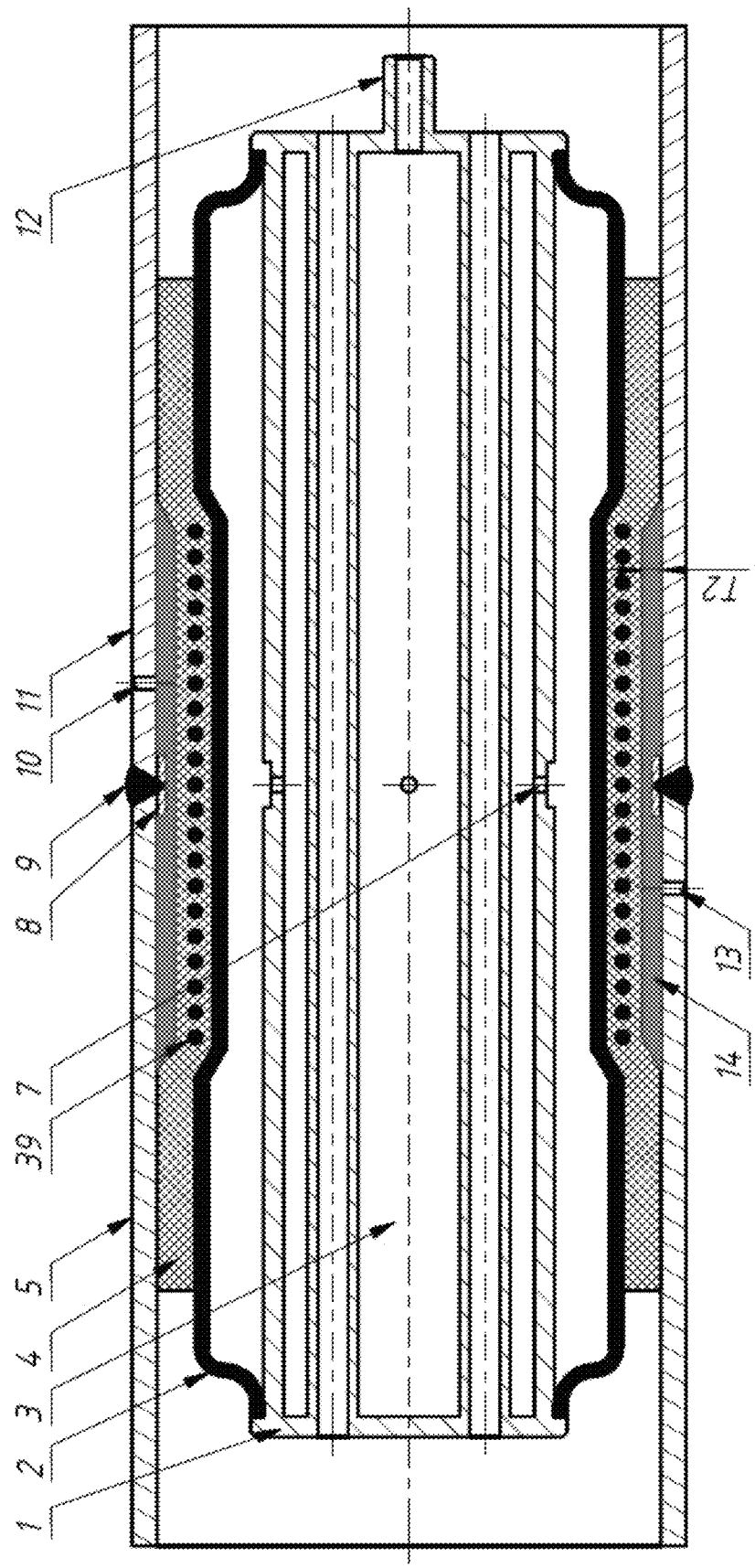
FIG. 33 shows the device of the present invention in accordance with the second embodiment of the invention in the position of filling the annular space with a compound through a hole in the pipeline, in its axial section.

FIG. 33 shows a device in accordance with the second embodiment of the invention for the internal monolithic insulation of a pipeline welded joint without using a protective bushing. The device comprises a power expanding actuator having an elastic working member 2 attached to a cylindrical case 1 with holes 7 and a nipple 12 (similarly to the device in accordance with the first embodiment), and a cylindrical casing 4 made of an elastic anti-adhesive material. In this case, the structure of the casing 4 designed for the insulation of the welded pipeline joint without a protective bushing is drastically different from the casing used when a protective bushing is present. The bed for the casing 4 for the insulation of the welded pipeline joint without the use of a protective bushing is made with the use of a resilient and elastic cord 39 integrated into the body of the casing 4. The cord 39 should have rebound elasticity of at least 8 to 10% to prevent the bed extension in the process of insulation. Such a construction of the casing 4 considerably limits the bed extension and thanks to that, in the operation condition, when the power actuator has the nominal pressure, the required gap T2 is provided between the external surface of the casing 4 bed and the internal walls of the pipes 5 and 11 of the welded joint. The hermetically sealing belts and the ends-tightening belts of the casing 4 are manufactured without any cord, and they are highly elastic. That is why, the working member 2 of the power actuator tightly press the hermetically sealing belts to the internal walls of pipes 5 and 11, while the smoothly-bending ends-tightening belts close the tightening circuit of the annular space cavity. As a result, the device according to the invention achieves the formation of a vacuum-tight annular space in the area of the welded pipeline joint without the use of a protective bushing.

Figure 34:
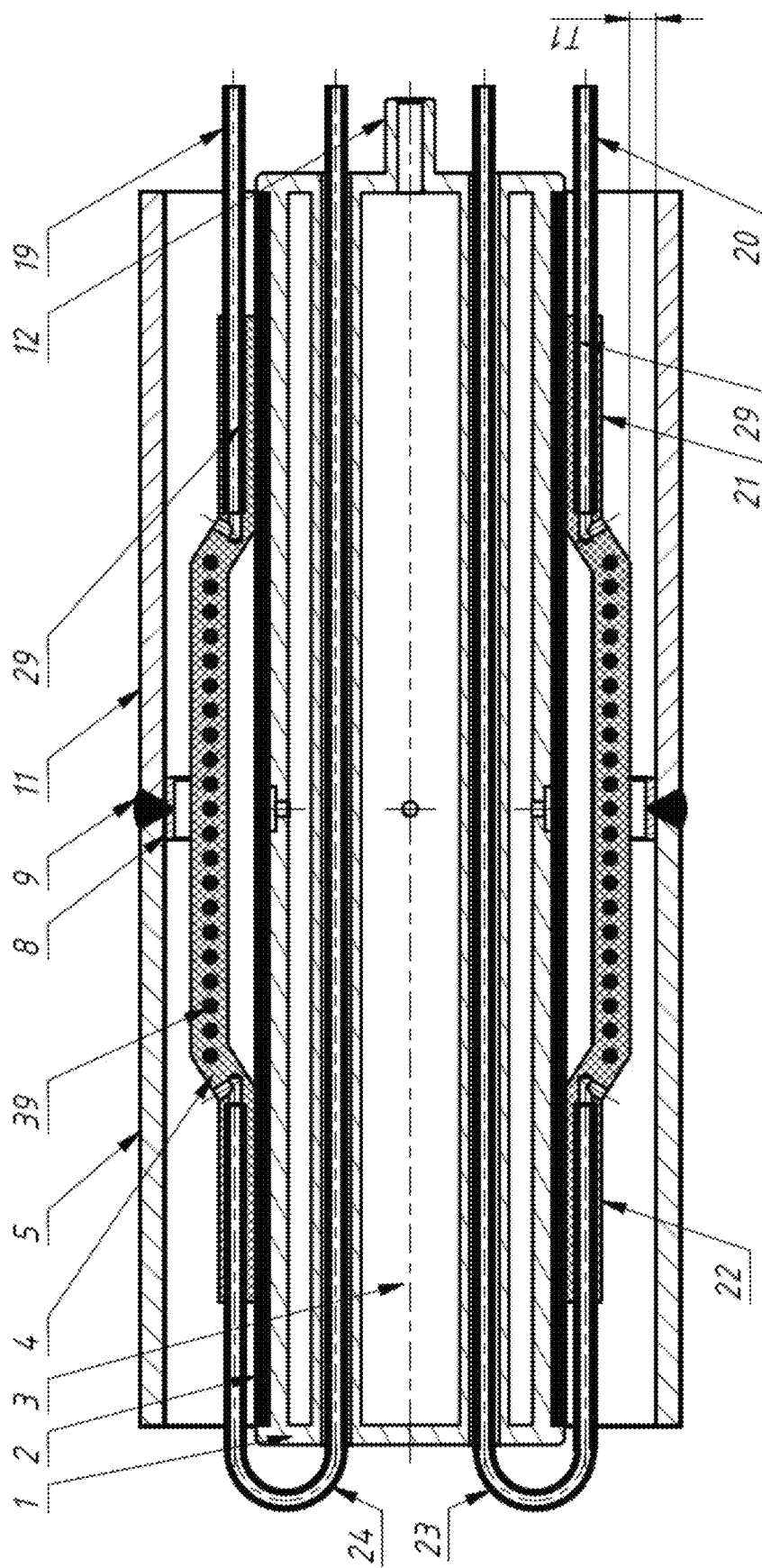
FIG. 34 shows the device in accordance with the second embodiment having a bilateral input of channel for air pumping out and for supplying a compound inside the pipe in the initial position, in its axial section.

The device in accordance with the second embodiment of the invention can comprise as well hermetically sealed inlets 29 (FIG. 34, 36) having channels for air pumping out and for compound supplying with a unilateral and a two-directional feed line, in a way similar to their execution in the device in accordance with the first embodiment.

Figure 35:
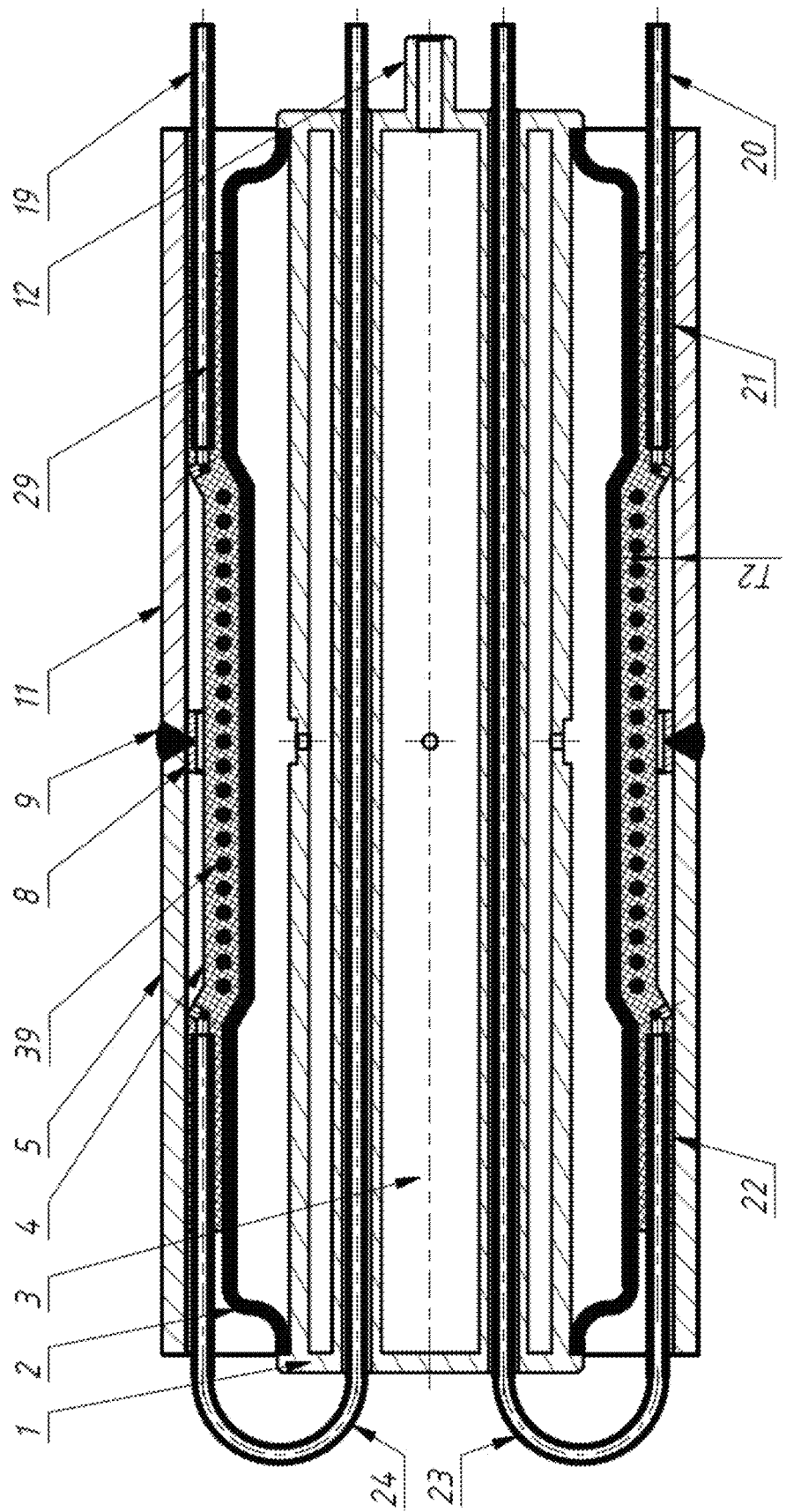
FIG. 35 shows the same view, in the position of hermetical sealing of the annular space.
Figure 36:
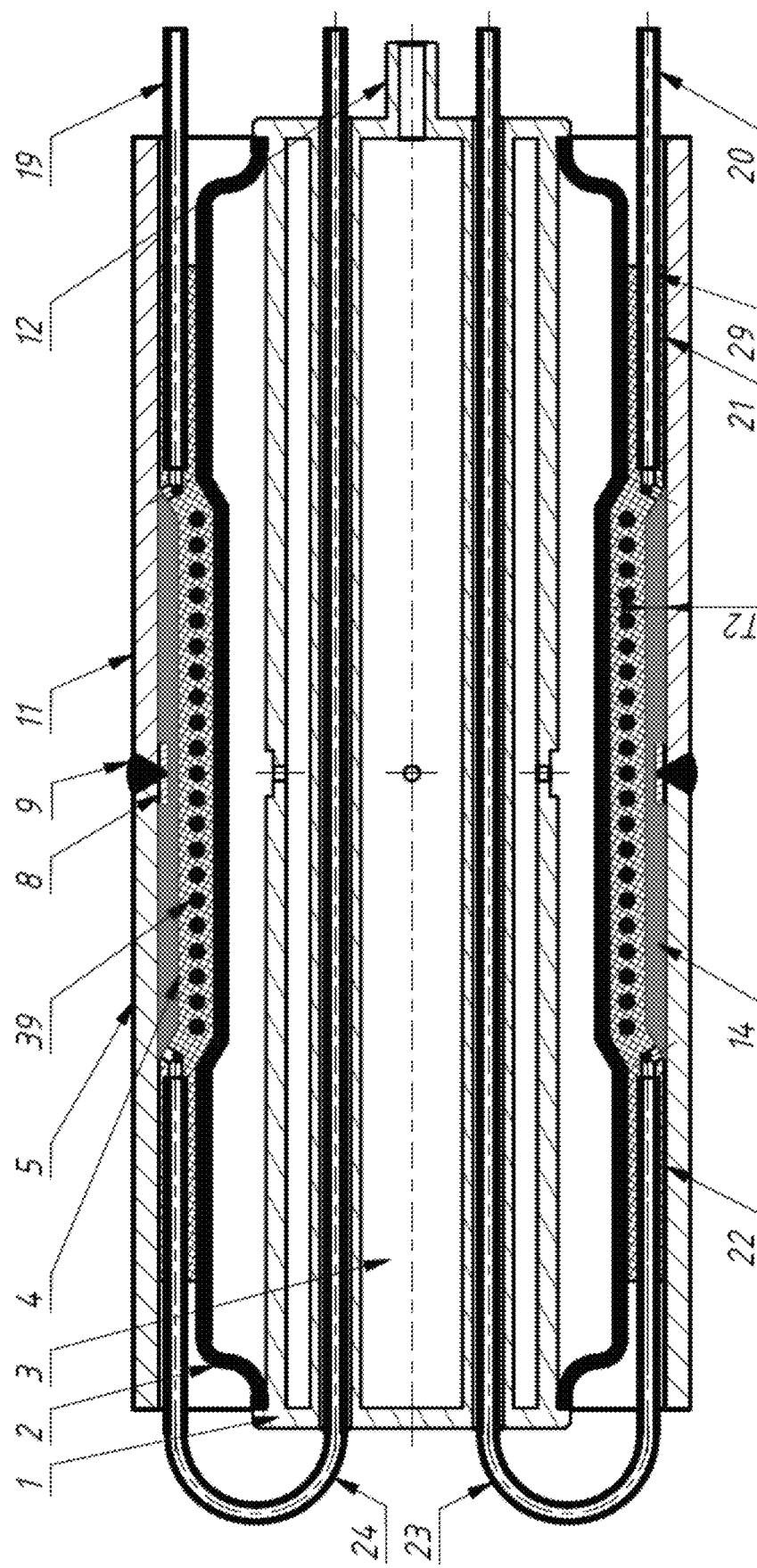
FIG. 36 shows the same view, in the position of filling of the annular space with a compound via channels in the casing.
Figure 37:
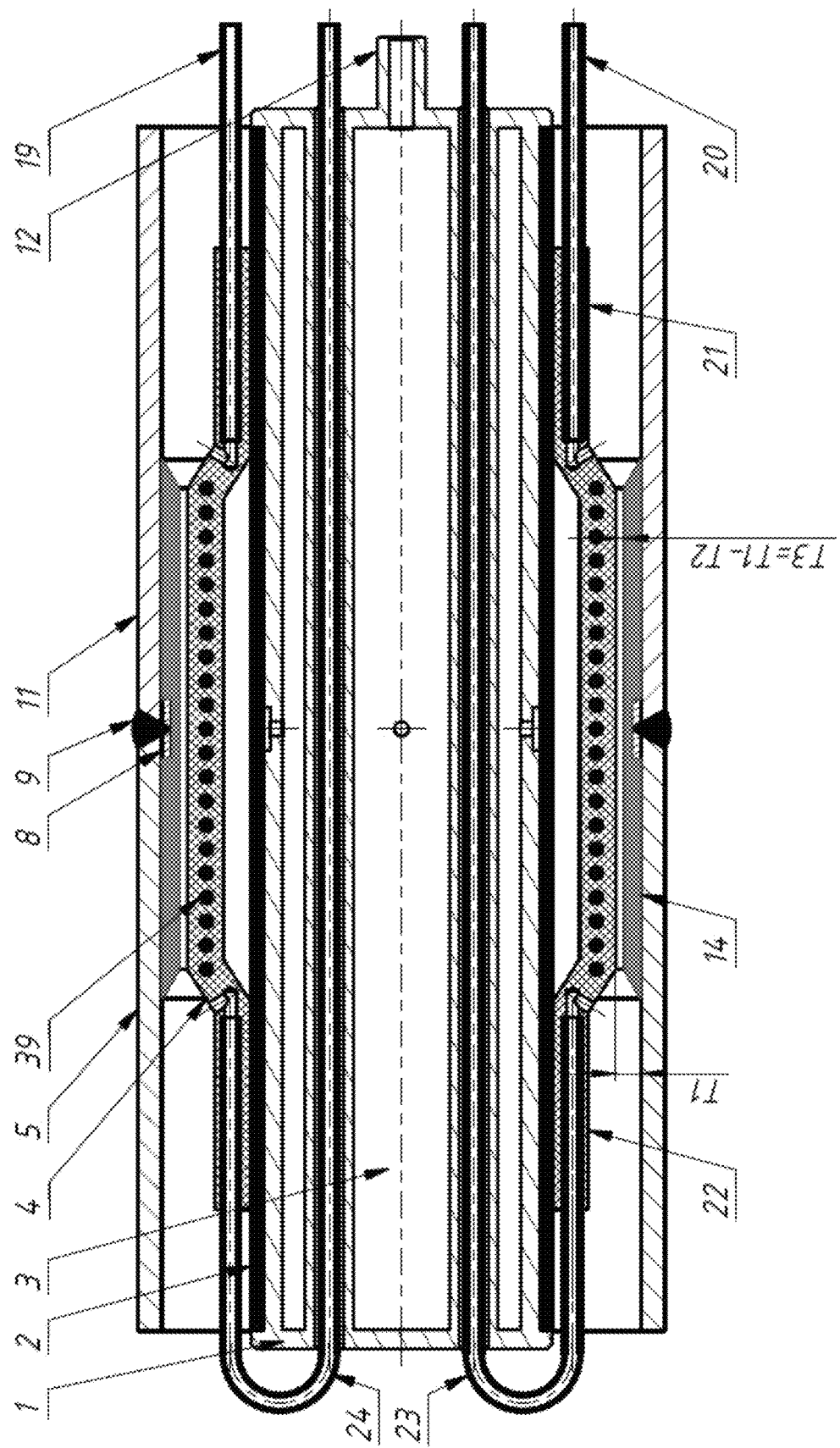
FIG. 37 shows the same view, in the position of contraction of the power actuator and of the separation thereof from the compound.

The annular space is vacuum-evacuated via the upper technological hole 10 in one of the pipes 5, 11 (FIG. 33) or via the hermetically sealed inlets 29 (FIG. 35). Tightness is controlled and the annular space is impregnated by supplying a compound via a lower technological hole 13 in one of the pipes 5, 11 (FIG. 33), or via the lower hermetically sealed inlets 29 (FIG. 36). The liquid compound is polymerized. Pressure is released at the power actuator. The elastic working member 2 of the power actuator is contracted and induces contraction of the casing 4, including that of the bed with the cord 39 (FIG. 37). As a result, a space T3 is formed between the bed of the casing 4 and the polymerized compound 14 (FIG. 37). The device is easily extracted from the pipeline cavity. In this way, the device according to the invention provides for the possibility to insulate the welded joint without the use of a protective bushing.

Figure 38:
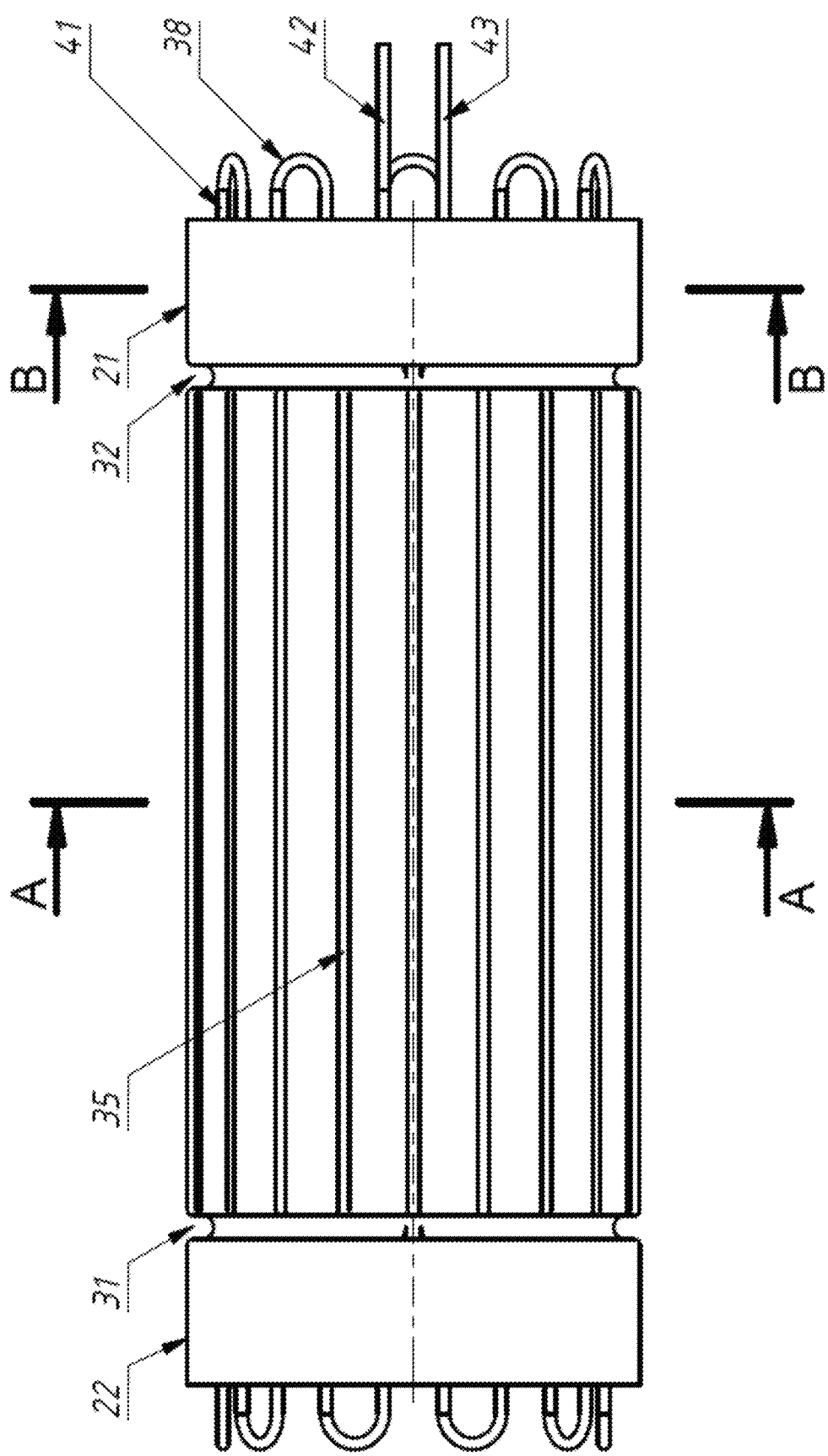
FIG. 38 shows the casing of the device in accordance with the first embodiment with an incorporated heating device, in general view.
Figure 40:
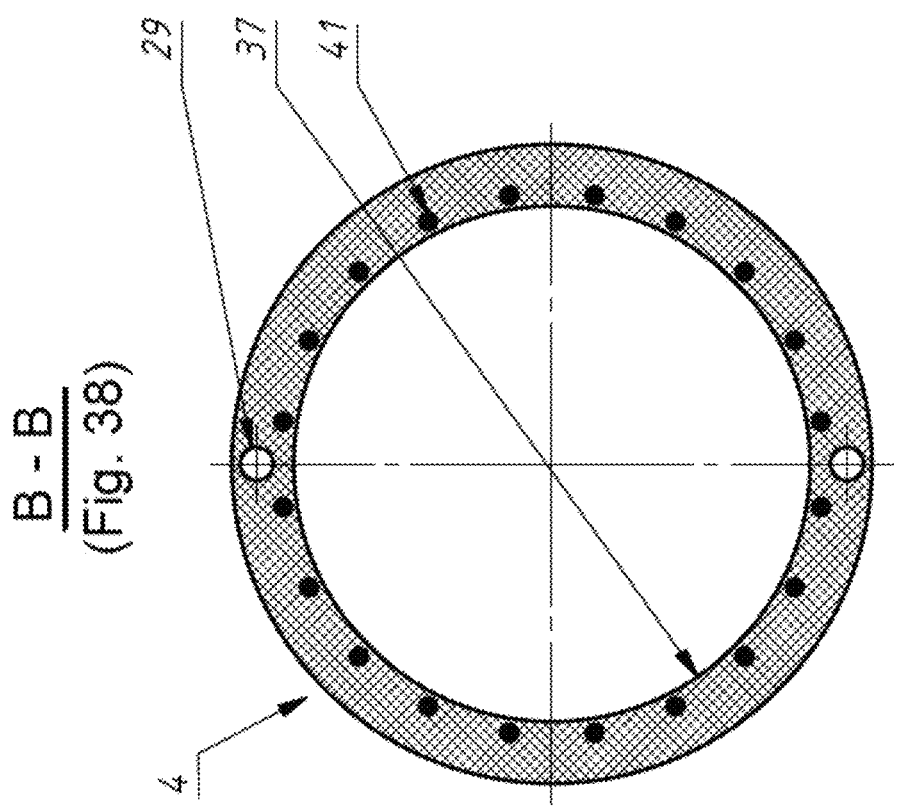
FIG. 40 shows a B-B section of FIG. 38.
Figure 39:
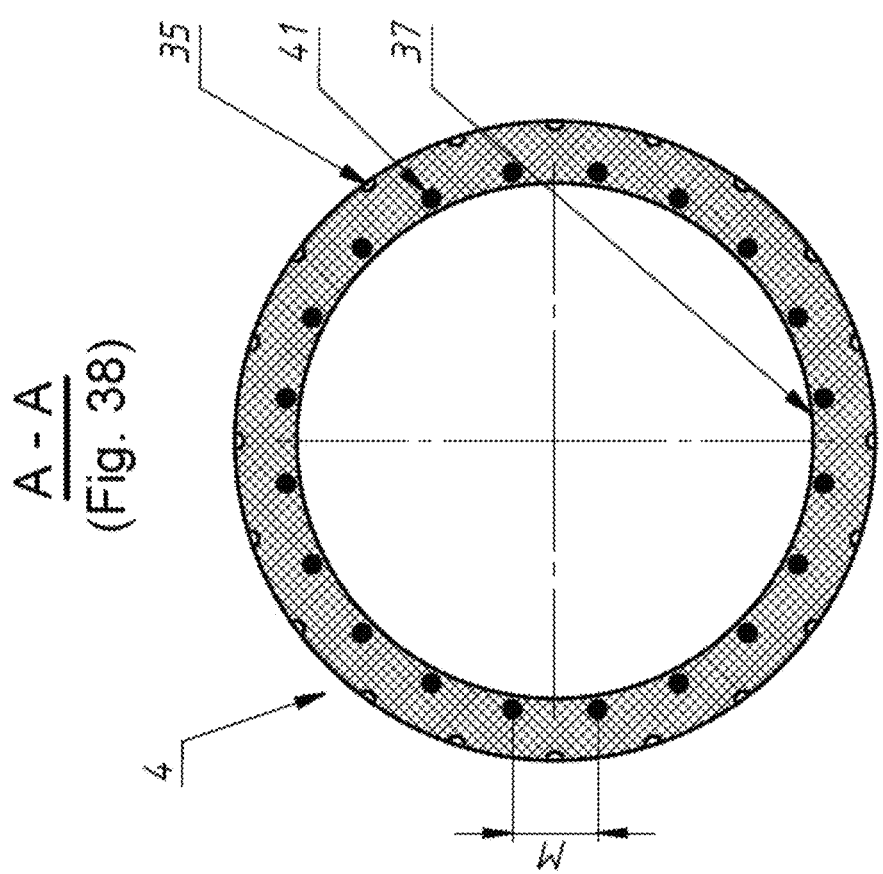
FIG. 39 shows an A-A section of FIG. 38.
Figure 41:
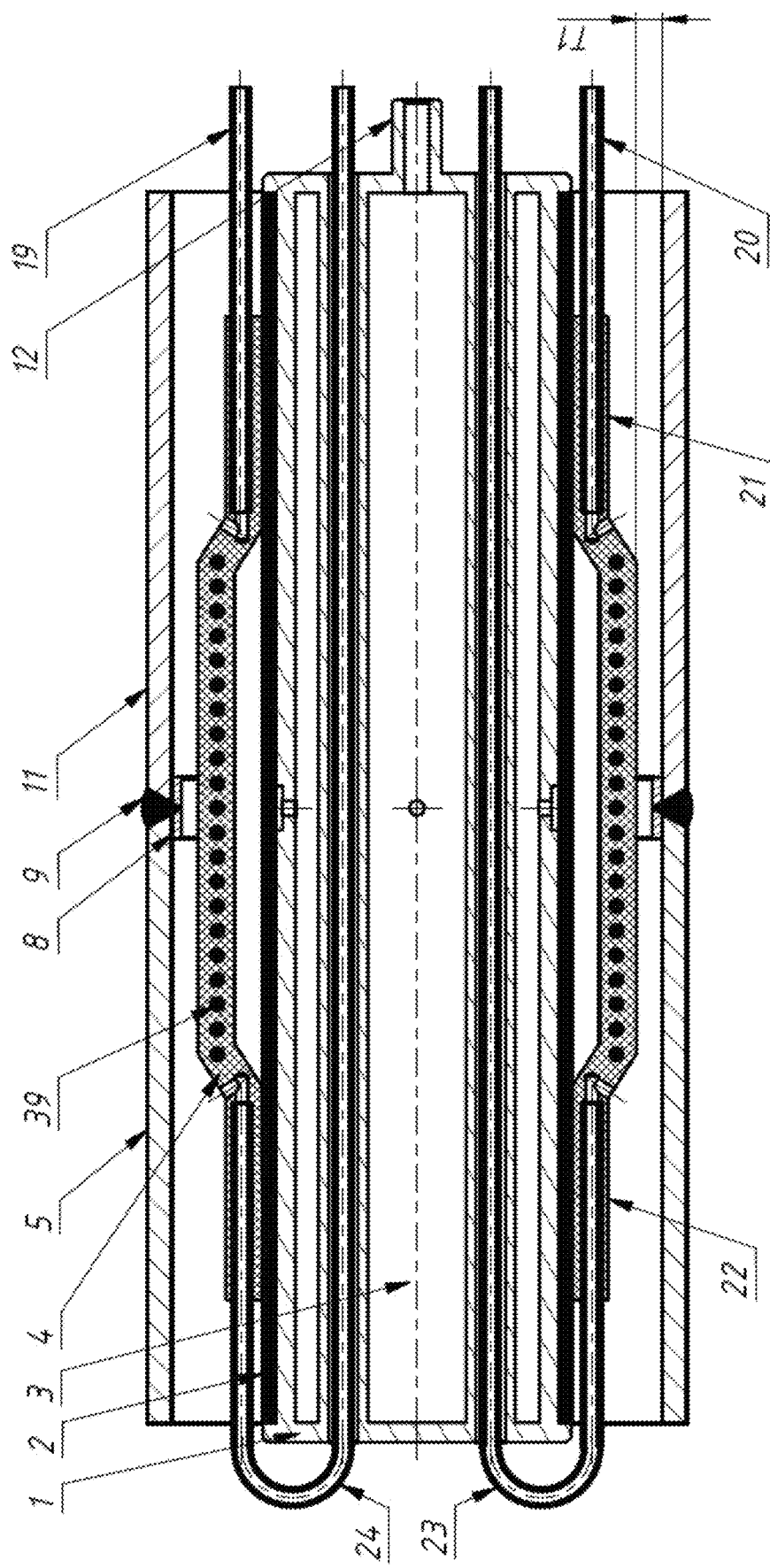
FIG. 41 shows the same view as in FIG. 38, from the end side.

FIG. 38 shows a casing of the device in accordance with the first embodiment of the invention having an integrated heating performed by a flexible heating cable 41 (FIG. 39, 40) built-in into the casing body 4 (FIG. 41). When carrying out the insulation of the welded joint, the casing 4 undergoes elastic deformations only by the extension of the diameter thereof, while in the longitudinal direction, the casing does not suffer in practice any deformations, its dimensions remain stable. That is why the heating cable 41 in the casing 4 has only longitudinal coils. On the borders of the casing 4, at the outlet of the heating cable 41 coils, loops 38 are provided. In the initial position of the casing 4, the distance between the coils of the flexible heating cable 41 is equal to the value M (FIG. 39). When the casing is expanded, the distance M between the coils of the heating cable 41 increases proportionally to the expansion of the casing 4. The loops 38 (FIGS. 39, 41) of the heating cable 41 compensate these shifts in the casing 4. From the viewpoint of commodity and security, the outlets 42 and 43 of the heating cable 41 (FIGS. 38, 41) are arranged at one side. The heating system built-in into the casing 4 makes the process of tightening the welded joint at low ambient air temperatures considerably more easier and enables one to considerably improve the control of the liquid compound polymerization process and to accelerate the whole process of the welded joint insulation. For example, at a fast heating of the casing 4, the thinnest layers of liquid compound will be primarily heated on the ends of the protective bushing. In turn, this fact will give rise to the obstruction of the remaining liquid compound and will prevent leakage thereof from the annular space in the case of a premature removal of the device from the pipeline cavity. At the same time, further polymerization process of the liquid compound inside the annular space cavity stopped in this way will inevitably occur at lower temperatures with a lower rate, and it will not have any effect on the process of the welded joint insulation.

The device for the internal insulation of a welded pipeline joint according to the present invention demonstrates the technical advantages as follows.

1. The device according to the present invention enables one to completely eliminate the effect of welding defects on the quality of the internal insulation of the welded pipeline joint.

2. The use by the device of a cylindrical highly elastic anti-adhesive casing that is coaxially located on the external semi-rigid surface of the elastic working member of the power actuator provides for the combination of the set of properties for the device for the internal insulation of the welded pipeline joint according to the present invention, that are necessary for carrying out the internal insulation of the welded joint with the use of vacuum.

3. The device according to the invention provides for the possibility to make a qualitative assessment of the tightness of the annular space in the area of the welded joint on the basis of the dripping down degree. In this case, the leaks with a summarized equivalent diameter from some micrometers and higher can be determined at the stage of air pumping out from the annular space. When stopping the air pumping out channel for some seconds, one detects summarized leaks with the equivalent diameter from 50 to 100 nanometers. Detection of lesser-sized leaks can be carried out within several minutes, but in practice they have no considerable influence on the quality of the vacuum impregnation, that is why they do not require any detection thereof. After the vacuum impregnation and the compound polymerization, the annular space in the area of the welded joint acquires a guaranteed absolute tightness, and a reiterated control of the insulation is not necessary.

4. The full control of the end annular space hermetic sealing and the high elasticity of the casing enable one to provide an easy control of the tightness degree of the end annular spaces directly during the process of the insulation of a welded joint with the use of vacuum thanks to the pressure regulation inside the power actuator and, when necessary, thanks to a local modification of the device location relative to the position of the welded seam.

5. The device in accordance with the present invention (first embodiment) provides for a possibility to transport the protective bushing inside the welded portion of the pipeline and to carry out its positioning relative to the welded seam cavity and to the pipeline axis with a subsequent insulation of the welded joint both on open and on closed portions, including under water.

6. The device (in accordance with the first embodiment) provides for a possibility to use protective bushes of any shape, including cylindrical or streamlined for the insulation of a welded joint.

7. The device (made without a case) provides for a possibility to carry out the insulation welded joints having bends (branches).

8. The device in accordance with the second embodiment provides for a possibility to insulate a welded joint without the use of a protective bushing.

9. The device provides for the possibility to carry out the air pumping out from the insulated annular space of the welded joint and the supply of a liquid compound into the last via the internal pipeline cavity directly via particular channels made on the casing of the device according to the present invention.

10. The device enables one to control in wide limits the place of moving the air pumping out channels from the annular space cavity and the place of compound supply into the last.

11. The device enables one to control the flow section of the air pumping out and of the compound supply channels.

12. When carrying out polymerization, the device enables one to perform the compound heating directly inside the pipeline.

The invention claimed is:

1. A device for the internal insulation of a welded pipeline joint, comprising a power actuator having a cylindrical elastic working member made with a possibility of radial expansion when an excessive pressure is built in a cavity thereof, and a protective bushing,
   wherein a cylindrical casing made of an elastic anti-adhesive material is coaxially placed onto the external surface of the working member,
   wherein the protective bushing is located in the middle part of the surface of said casing in the expanded state of the working member with the possibility of forming a closed sealed annular cavity between the protective bushing, a surface of the pipeline in a welded joint area and sections of the casing that overlap end ring gaps between ends of the protective bushing and the surface of the pipeline when expanding parts of the working member on both sides of the protective bushing and end sections of the casing are pressed to the surface of the pipeline.

2. The device according to claim 1, wherein the power actuator comprises a case made as a hollow cylinder closed on its ends and having a nipple on an end and holes in a cylindrical wall, the elastic working member being coaxially attached outside the case.

3. The device according to claim 1, wherein the power actuator is made without a case while the working member is made closed and comprises a nipple.

4. The device according to claim 1, wherein the casing is made with a bed for the protective bushing, made as an annular recess with lateral annular stops in the shape of steps on the outer surface of the casing.

5. The device according to claim 1, wherein the casing is made with a bed for the protective bushing, made as an annular recess open at one side and having a lateral annular stop in the shape of a step on the outer surface of the casing.

6. The device according to claim 1, wherein the casing is composed of two parts the axial distance between which is less than the length of the protective bushing.

7. The device according to claim 1, wherein the casing is made with at least one channel to pump out air and with at least one channel for supplying a compound, the inlet of each channel being located near the casing end and the outlet being located on the external surface thereof in the area of the border of the portion designed to be attached to a protective bushing.

8. The device according to claim 7, wherein the at least one channel to pump out air and the at least one channel for supplying a compound are located near one end of the casing and are provided with hermetically sealed inlets.

9. The device according to claim 7, wherein the at least one channel to pump out air and the at least one channel for supplying a compound are located at different ends of the casing and are provided with hermetically sealed inlets.

10. The device according to claim 9, wherein the casing has an annular distribution groove located at a distance from each end, one annular groove communicating with the at least one channel to pump out air and the other one communicating with the at least one channel for supplying a compound.

11. The device according to claim 10, wherein the casing has longitudinal grooves at a portion of the external surface between the distribution grooves, that communicate with the last.

12. The device according to claim 11, wherein the longitudinal grooves are extended along the whole length of the portion between the distribution grooves.

13. The device according to claim 11, wherein an annular recess having inclined borders is provided on the middle portion of the external surface between the distribution grooves, the longitudinal grooves being located on the edges of the portion of the external surface of the casing, that adjoin the distribution grooves.

14. The device according to claim 13, wherein annular stops are provided made as steps on the borders of the annular recess.

15. The device according to claim 11, wherein each of the longitudinal grooves has a length inferior to the half-length of the portion of the external surface of the casing between the distribution grooves in order to form a smooth portion of the external surface in the middle part of the casing.

16. The device according to claim 9, wherein the casing has two annular distribution grooves located at a distance from each end, one of which communicating with the at least one channel to pump out air and the other one communicating with the at least one channel for supplying a compound.

17. The device according to claim 1, wherein a heating element is built-in into the casing, made as a flexible cable with longitudinal coils, some portions of which being located inside the casing along its axis, while the portions that connect the last are located outside the ends of the casing.

18. A device for the internal insulation of a welded pipeline joint, comprising a power actuator having a cylindrical elastic working member made with a possibility of radial expansion when an excessive pressure is built in a cavity thereof,
wherein a cylindrical casing made of an elastic anti-adhesive material the middle annular part of which is reinforced with an elastic cord is coaxially placed onto the external surface of the working member with the possibility of forming a closed sealed annular cavity between the reinforced annular part of the casing and a surface of the pipeline in a welded joint area when expanding the parts of the working member on both sides of the reinforced annular part of the casing and pressing non-reinforced end sections of the casing to the pipeline surface.

19. The device according to claim 18, wherein the power actuator comprises a case made as a hollow cylinder closed on its ends and having a nipple on one end and holes in the cylindrical wall, the elastic working member being coaxially attached outside the case.

20. The device according to claim 18, wherein the casing is made with at least one channel to pump out air and with at least one channel for supplying a compound, the inlet of each channel being located near the casing end, while the outlet is located on the external surface thereof in a ridge zone of the reinforced portion.

21. The device according to claim 20, wherein the at least one channel to pump out air and the at least one channel for supplying a compound are located near one end of the casing and are provided with hermetically sealed inlets.

22. The device according to claim 20, wherein the at least one channel to pump out air and the at least one channel for supplying a compound are located near different ends of the casing and are provided with hermetically sealed inlets.

* * * * *